United States Patent
Bamji et al.

(10) Patent No.: US 6,919,549 B2
(45) Date of Patent: Jul. 19, 2005

(54) METHOD AND SYSTEM TO DIFFERENTIALLY ENHANCE SENSOR DYNAMIC RANGE

(75) Inventors: Cyrus Bamji, Fremont, CA (US); Hakan Yalcin, Fremont, CA (US); Xinqiao Liu, San Jose, CA (US); Ender Tunc Eroglu, San Jose, CA (US)

(73) Assignee: Canesta, Inc., Sunnyvale, CA (US)

( * ) Notice: Subject to any disclaimer, the term of this patent is extended or adjusted under 35 U.S.C. 154(b) by 0 days.

(21) Appl. No.: 10/823,415

(22) Filed: Apr. 12, 2004

(65) Prior Publication Data

US 2005/0051707 A1 Mar. 10, 2005

(Under 37 CFR 1.47)

Related U.S. Application Data

(60) Provisional application No. 60/462,167, filed on Apr. 11, 2003.

(51) Int. Cl.$^7$ .............................................. H01L 27/00
(52) U.S. Cl. ................................ 250/208.1; 250/214 R
(58) Field of Search ......................... 250/208.1, 214 R, 250/214.1, 214 P; 348/294, 296, 301, 302, 308; 257/290, 291, 292

(56) References Cited

U.S. PATENT DOCUMENTS

| | | |
|---|---|---|
| 3,830,567 A | 8/1974 | Riegl |
| 4,277,167 A | 7/1981 | Eppel |
| 4,708,473 A | 11/1987 | Metzdorff et al. |
| 4,733,609 A | 3/1988 | Goodwin et al. |
| 4,764,982 A | 8/1988 | Pfund |
| 4,954,972 A | 9/1990 | Sullivan |
| 5,309,212 A | 5/1994 | Clark |
| 5,319,387 A | 6/1994 | Yoshikawa |
| 5,353,109 A | 10/1994 | Langdon et al. |
| 5,359,511 A | 10/1994 | Schroeder et al. |
| 5,446,529 A | 8/1995 | Stettner et al. |
| 5,682,229 A | 10/1997 | Wangler |
| 5,710,621 A | 1/1998 | Tamura |
| 5,739,901 A | 4/1998 | Fujioka et al. |
| 5,767,842 A | 6/1998 | Korth |
| 5,798,519 A | 8/1998 | Vock et al. |
| 5,835,204 A | 11/1998 | Urbach |
| 5,892,575 A | 4/1999 | Marino |
| 5,898,484 A | 4/1999 | Harris |
| 5,936,615 A | 8/1999 | Waters |
| 5,940,170 A | 8/1999 | Berg et al. |

(Continued)

FOREIGN PATENT DOCUMENTS

DE     198 21 974 A1     11/1999

*Primary Examiner*—Que T. Le
(74) *Attorney, Agent, or Firm*—Dorsey & Whitney LLP

(57) ABSTRACT

Effective differential dynamic range in a differential pixel detector is increased by avoiding saturation effects due to common mode contribution in optical energy to be detected. Photocurrent generated by each photodetector pair is directly integrated by an associated capacitor over an integration time T. Within time T, before either integrated capacitor voltage reaches $V_{sat}$ for the photodetector, at least one of the capacitors is reset to a voltage such that the desired differential detector signal is still determinable. Reset may be generated externally or internally to the differential pixel detector.

27 Claims, 15 Drawing Sheets

U.S. PATENT DOCUMENTS

| | | |
|---|---|---|
| 5,953,110 A | 9/1999 | Burns |
| 6,006,021 A | 12/1999 | Tognazzini |
| 6,043,805 A | 3/2000 | Hsieh |
| 6,064,354 A | 5/2000 | DeLuca |
| 6,115,114 A | 9/2000 | Berg et al. |
| 6,115,128 A | 9/2000 | Vann |
| 6,137,566 A | 10/2000 | Leonard et al. |
| 6,181,412 B1 | 1/2001 | Popescu et al. |
| 6,241,675 B1 | 6/2001 | Smith et al. |
| 6,281,878 B1 | 8/2001 | Montellese |
| 6,310,682 B1 | 10/2001 | Gavish et al. |
| 6,323,942 B1 | 11/2001 | Bamji |
| 6,448,572 B1 | 9/2002 | Tennant et al. |
| 6,456,368 B2 | 9/2002 | Seo |
| 6,512,838 B1 | 1/2003 | Rafii et al. |
| 6,515,740 B2 | 2/2003 | Bamji et al. |
| 6,522,395 B1 | 2/2003 | Bamji et al. |
| 6,580,496 B2 | 6/2003 | Bamji et al. |
| 6,587,186 B2 | 7/2003 | Bamji et al. |
| 6,614,422 B1 | 9/2003 | Rafii et al. |
| 6,635,857 B1 * | 10/2003 | Kindt ............... 250/208.1 |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |

* cited by examiner

METHOD AND SYSTEM TO DIFFERENTIALLY ENHANCE SENSOR DYNAMIC RANGE

CROSS-REFERENCES TO RELATED APPLICATIONS

Priority is claimed from applicant's U.S. Provisional Patent Application No. 60/462,167 filed on 11 Apr. 2003 entitled "Differential Dynamic Range Enhancement Methods and Systems", assigned to Canesta, Inc., the entire content of which application is incorporated herein by reference.

FIELD OF THE INVENTION

The invention relates generally to optical sensors, and more particularly to enhancing dynamic range of such sensors, while allowing the sensors to be fabricated using CMOS techniques.

BACKGROUND OF THE INVENTION

Systems that rely upon sensing optical energy to discern information are known in the art and have many applications. Exemplary applications might include an optical-based system to determine range between the system and a target object, or to identify and recognize features of a target object. Many such systems acquire two-dimensional or intensity-based information, and rely upon an intensity image of light reflected from a target object. Such luminosity-based systems can use ambient light falling upon the target object, or may actively generate light that is directed toward the target object.

Unfortunately, it is difficult to accurately determine distance solely from the amplitude and brightness of an intensity image. For example, in a range finding system, a highly reflecting target object that is father away from the system can produce a greater amplitude signal than a nearer target object that is less reflective. The result would be that the more distant, shiny, object is erroneously reported as being closer to the system than the closer, duller, object. In a range finding system used to control robot machinery in an industrial setting, such errors may be intolerable for reasons of safety to nearby human operators. If such a system is used to identify and recognize different target objects, an object might be misidentified. Simply stated, two-dimensional intensity-based systems are very prone to measurement error.

The present invention may be used in a wide range of applications including, but not limited to, range finding systems. It may be useful at this juncture to briefly review such systems.

U.S. Pat. No. 6,323,942 to Bamji et al. (November 2001) entitled "CMOS-Compatible Three-Dimensional Image Sensor IC" describes a three-dimensional range finding system that can determine range distance without reliance upon luminosity-based data, the entire content of which patent is incorporated herein by this reference. As disclosed in the '942 patent, such a system generates a depth map that contains the distance Z from each pixel in a CMOS-compatible sensor array to a corresponding location on a target object. Applicants refer to and incorporate by reference the '942 patent as background material. U.S. Pat. No. 6,580,496 to Bamji et al. (June 2003) entitled "Systems for CMOS-Compatible Three-Dimensional Image Sensing Using Quantum Efficiency Modulation" describes the use of quantum modulation techniques and differential detectors suitable for a three-dimensional range finding system, the entire content of which patent is incorporated herein by this reference. In the '496 patent the quantum efficiency of the substrate upon which differential CMOS sensors were fabricated was modulated synchronously with optical energy emitted from an energy source. Applicants refer to and incorporate by reference the '496 patent as background material.

FIG. 1 is a block diagram of a three-dimensional range finding system as exemplified by the '942 patent or the '496 patent. Such systems determine distance Z between the system and locations on target object 20. System 10 may be fabricated upon a single IC 30, requires no moving parts, and relatively few off-chip components, primarily a source of optical energy 40, e.g., a light emitting diode (LED) or laser source, and associated optics 50. If desired, laser source 40 might be bonded onto the common substrate upon which IC 30 is fabricated.

System 10 includes an array 60 of pixel detectors 70, each of which has dedicated circuitry 80 for processing detection charge output by the associated detector. (As used herein, the terms "detector" and "pixel" and "pixel detector" may be used interchangeably.) Array 60 might include 100×100 pixels 70, and 100×100 associated detector processing circuits 80. One will appreciate that other configurations may be used. IC 30 preferably also includes a microprocessor or microcontroller unit 90, RAM and ROM memory, collectively 100, a high-speed distributable clock 110, and various computing and input/output (I/O) circuitry 120. System 10 preferably further includes a lens 130 to focus light reflected from target object 20 upon pixels 70 in array 60. As noted in the above-mentioned patents, controller unit 90 may carryout distance-to-object and object velocity calculations and can output such calculations as DATA, for use by a companion device, if desired. As seen in FIG. 1, substantially all of system 10 may be fabricated upon CMOS IC 30, which enables shorter signal paths, and reduced processing and delay times. Also shown in FIG. 1 is ambient light that is present in the environment in which system 10 and target object 20 are found. As described herein, high levels of ambient light relative to levels of light from energy source 40 can be detrimental to reliable operation of system 10.

In brief, microprocessor 90 can calculate the roundtrip time for optical energy from source 40 to travel to target object 20 and be reflected back to a pixel 70 within array 60. This time-of-flight (TOF) is given by the following relationship:

$$Z = C \cdot t/2 \qquad \text{eq. (1):}$$

where C is velocity of light.

Thus, without reliance upon luminosity information, system 10 can calculate that $Z1 = C \cdot t1/2$, $Z2 = C \cdot t2/2$, $Z2 = C \cdot t3/2$, and so on. The correct Z distances are obtained, even if more distant regions of target object 20 happen to be more reflective than nearer regions of the target object.

The ability of system 10 to determine proper TOF distances Z can be impacted when the magnitude of ambient light is large relative to the magnitude of reflected light from source 40. What occurs is that the various pixels 70 respond to incoming optical energy that represents the real signal to be measured (e.g., active energy originating from source 40 and reflected by target object 20), and also respond to ambient light. The depth resolution of each pixel, i.e., the accuracy of the distance measurement, is determined by the system signal-to-noise ratio (SNR). Even if ambient light could be measured and subtracted from the total signal, its noise component (e.g., shot noise) would still degrade system performance. Further, the presence of ambient light can have even more severe consequences by causing the pixel detector to saturate.

In a so-called differential pixel detector, the active optical energy contributes to both a differential mode signal and a common mode signal, while ambient light only contributes to the common mode signal. While differential pixel detectors can exhibit higher SNR than single-ended pixel detectors, the presence of strong ambient light, sunlight perhaps, can degrade the performance of differential pixel detectors, as will now be described. As used herein, the term "differential detector" refers to a detector that responds to two input parameters. For example in the '496 patent, the differential detectors responded to amplitude of incoming optical energy and to phase of such energy relative to energy output by emitter 40; see FIG. 1 herein. Typically the singular term "pixel" will refer to a pair of differential photodetectors, for example first and second photodiode detectors $D_A$ and $D_B$.

Incoming optical energy falling upon a pixel detector 70 generates an extremely small amount of photocurrent (or photocharge), typically on the order of picoamps ($10^{-12}$ amps). Such detection current signals are too small in magnitude to be measured directly. It is known in the art to provide pixel detectors that operate in a direct integration mode by which optical energy induced photocurrent is integrated on a capacitor and the final capacitor charge or voltage is readout at the end of an integration interval. A capacitor $C_x$ has finite maximum charge capacity $Q_{max}$ defined by:

$$Q_{max} = C_x \cdot V_{swing} \qquad \text{eq. (2):}$$

where $C_x$ is the total capacitance and $V_{swing}$ is the maximum voltage swing across the capacitor. A pixel detector is said to be in saturation when the total charge integrated on the capacitor exceeds the maximum charge capacity, in which case no useful information can be readout from that pixel.

A differential pixel detector (e.g., detectors 70 in FIG. 1) may be represented as shown generically in FIG. 2A, in which modulation circuitry has been omitted for simplicity. Each pixel 70 has a differential structure with two perhaps identical reset and readout circuit components denoted A and B. Components A and B may be considered as part of the pixel 70 or as part of the pixel's associated circuitry 80. For ease of depictions, the photodetector pair comprising each differential pixel 70 is shown as photodiodes $D_A$ and $D_B$, but other detector structures could be used instead, for example photogate structures. Capacitors $C_A$ and $C_B$ are shown in parallel with diodes $D_A$ and $D_B$ and represent detector parasitic capacitance and/or dedicated fixed value capacitors.

Referring briefly to FIG. 1, within system 10 microprocessor 90 causes optical energy source 40 to emit pulses of light that are directed by lens 50 toward target object 20. Some of this optical energy will be reflected back towards system 10 and will be focused by lens 130 onto pixels 70 within array 60. Incoming photon energy falling upon a detector 70 will cause photodetector pair $D_A$ and $D_B$ to generate a small amount of detection signal current that can be directly integrated by capacitors $C_A$ and $C_B$. Before the start of integration, microprocessor 90 will cause photodetectors $D_A$ and $D_B$ and their respective capacitors $C_A$ and $C_B$ to be reset to a reference voltage $V_{ref}$. For the components shown in FIG. 2A, reset is caused by raising a reset signal $\Phi_{reset}$ (see FIG. 2B). During the integration time, photocurrent generated by detectors $D_A$ and $D_B$ respectively discharge associated capacitors $C_A$, $C_B$, as shown in FIG. 2B. During the integration time, the voltage seen at nodes $S_A$, $S_B$ will decrease as a function of the photocurrent generated by the associated photodiode $D_A$, $D_B$. The magnitude of the photodiode-generated photocurrent will be a function of the amount of light energy received by the respective pixel 70 in array 60 in that the amount of light received by the pixel determines the final voltage on nodes $S_A$ and $S_B$.

Readout circuitry is provided for circuit A and B, comprising transistors $T_{follower}$ and $T_{read}$. At the end of the integration time, which will be a function of the repetition rate of the optical pulses emitted from optical energy source 40, microprocessor 90 causes a readout signal $\Phi_{read}$ to go high. This enables the voltages on nodes $S_A$ and $S_B$ to be read-out of array 60, e.g., through a bitline. In the exemplary configuration of FIG. 2A, if the voltage on node $S_A$ or $S_B$ drops below a certain level denoted here as saturation voltage $V_{sat}$, the readout circuit cannot perform the reading operation properly. Therefore the dynamic range of such known differential pixel configuration shown in FIG. 2A is $(V_{ref} - V_{sat})$, as depicted in FIG. 2B. While the waveforms in FIG. 2B depict a diminishing potential at nodes $S_A$, $S_B$ as a function of photocurrent, one could instead configure the detector circuitry to charge rather than discharge a reference node potential.

But in addition to generating photocurrent in response to optical energy or active light (from emitter 40) reflected by target object 20, pixel 70 will also generate photocurrent in response to ambient light that is also integrated by capacitors $C_A$, $C_B$, thus affecting the potential at nodes $S_A$, $S_B$. FIG. 2B depicts two examples, showing the effect of relatively low magnitude ambient light, and relatively high magnitude of ambient light. In range finding applications, the difference $(A_{final} - B_{final})$ generally contains range information, and common mode is of lesser importance. As shown in FIG. 2B, relatively weak ambient light does not cause the pixel to saturate, and at the end of integration time, the final voltages read-out from the pixel are above $V_{sat}$. But relatively strong ambient light discharges the associated capacitor potential rapidly, which saturates the pixel. Due to the saturation condition, the pixel does not output any useful result in that the differential voltage, which contained range information, is now zero. Thus, a very real problem with prior differential pixel detectors is that the dynamic range of the pixel is not sufficient to handle strong ambient light.

Thus there is a need for a method and topology by which the dynamic range of a differential pixel detector can be enhanced such that degradation from ambient light is substantially reduced. Even in the presence of strong ambient light that might otherwise saturate the pixel, the differential response of the pixel should still be available. Further, such method and topology should be implementable using CMOS such that the differential sensor array can still be fabricated on a common IC with associated range finding system.

Embodiments of the present invention provide such methods and circuit topologies.

SUMMARY OF THE INVENTION

Effective differential dynamic range in a differential pixel detector is increased by avoiding saturation effects due to common mode contribution in optical energy to be detected. Photocurrent generated by each photodetector pair is directly integrated by an associated capacitor over an integration time T. The resultant capacitor voltage is proportional to detected optical energy including ambient light. Within time T, before either integrated capacitor voltage reaches $V_{sat}$ for the photodetector, at least one of the capacitors is reset to a voltage such that the desired differential detector signal is still determinable.

In one embodiment, at start of integration time T, the voltage across each capacitor is preset to a fixed $V_{ref}$ voltage. During integration time T whenever the integrated capacitor voltage of either capacitor reaches $V_{sat}$, that capacitor is reset to $V_{ref}$. After reset, capacitor voltages are again allowed to change as a function of photocurrent, and will be reset to $V_{ref}$ whenever and as soon as either capacitor voltage reaches $V_{sat}$. A count of total resets for each capacitor is maintained, and the amount of light falling upon each detector is a function of its final voltage at end of integration and the number of resets occurring during integration. In another embodiment, the common mode component of the integrated capacitor voltages is reset periodically to prevent either photodiode detector from saturating. However the differential component of the integrated capacitor voltages is preserved. The result is to extend effective differential dynamic range of the differential sensor in the presence of ambient light by avoiding the effects of saturation. Embodiments of the present invention can extend differential dynamic range of the differential sensor despite mismatching in the components implementing the differential pixel detector.

Other features and advantages of the invention will appear from the following description in which the preferred embodiments have been set forth in detail, in conjunction with the accompanying drawings.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
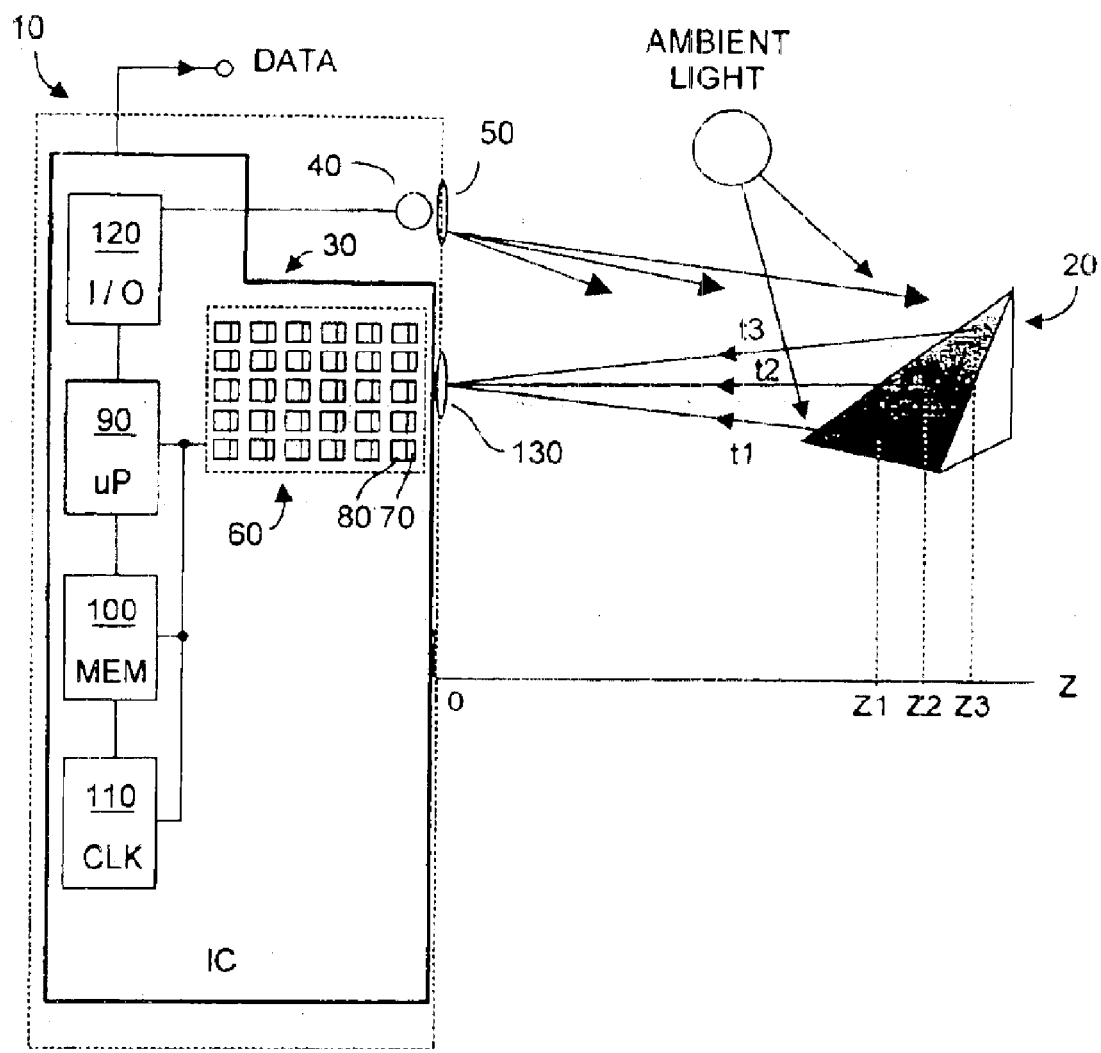
FIG. 1 depicts a three-dimension TOF system using conventional pixel detectors as exemplified by U.S. Pat. No. 6,323,942 and U.S. Pat. No. 6,580,496.
Figure 2A:
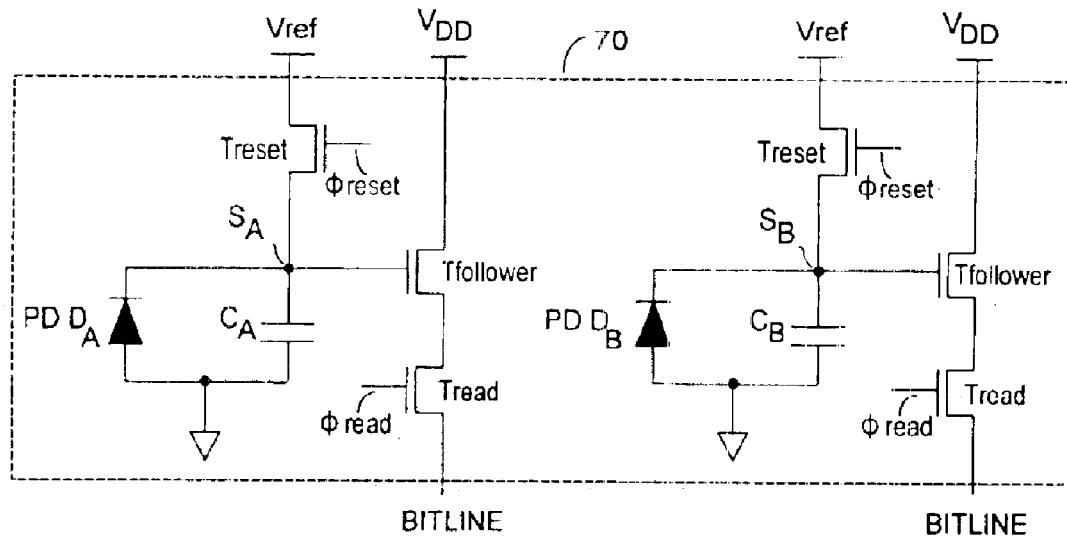
FIG. 2A depicts a conventional differential pixel detector.
Figure 2B:
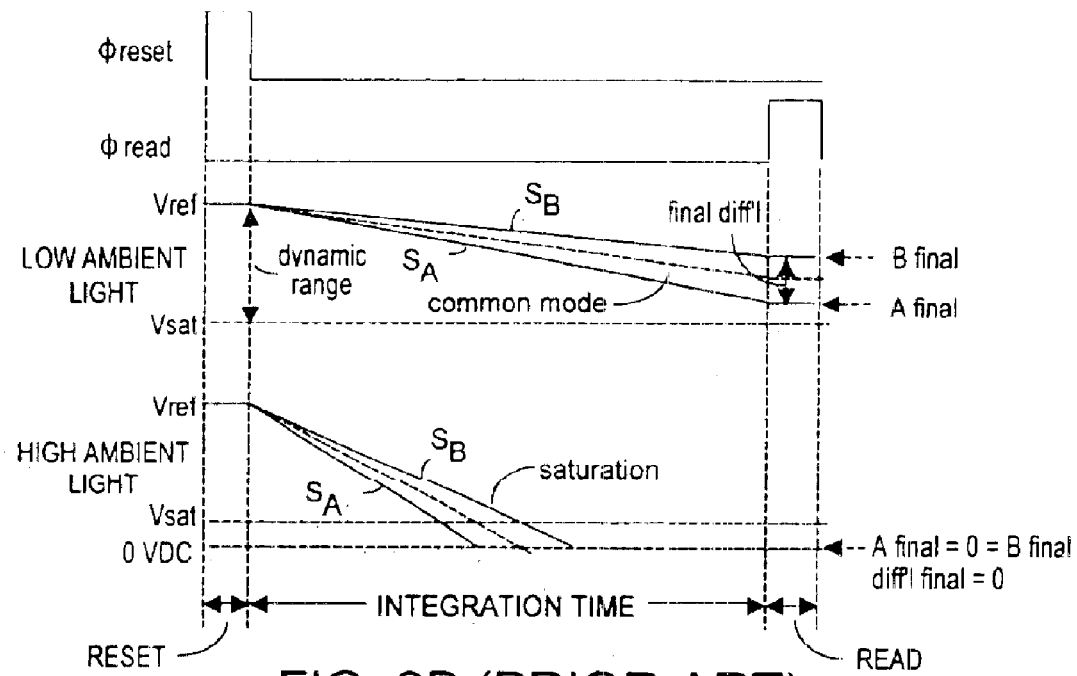
FIG. 2B depicts waveforms present in the detector of FIG. 2A showing the saturation effects of high ambient light.
Figure 3A:
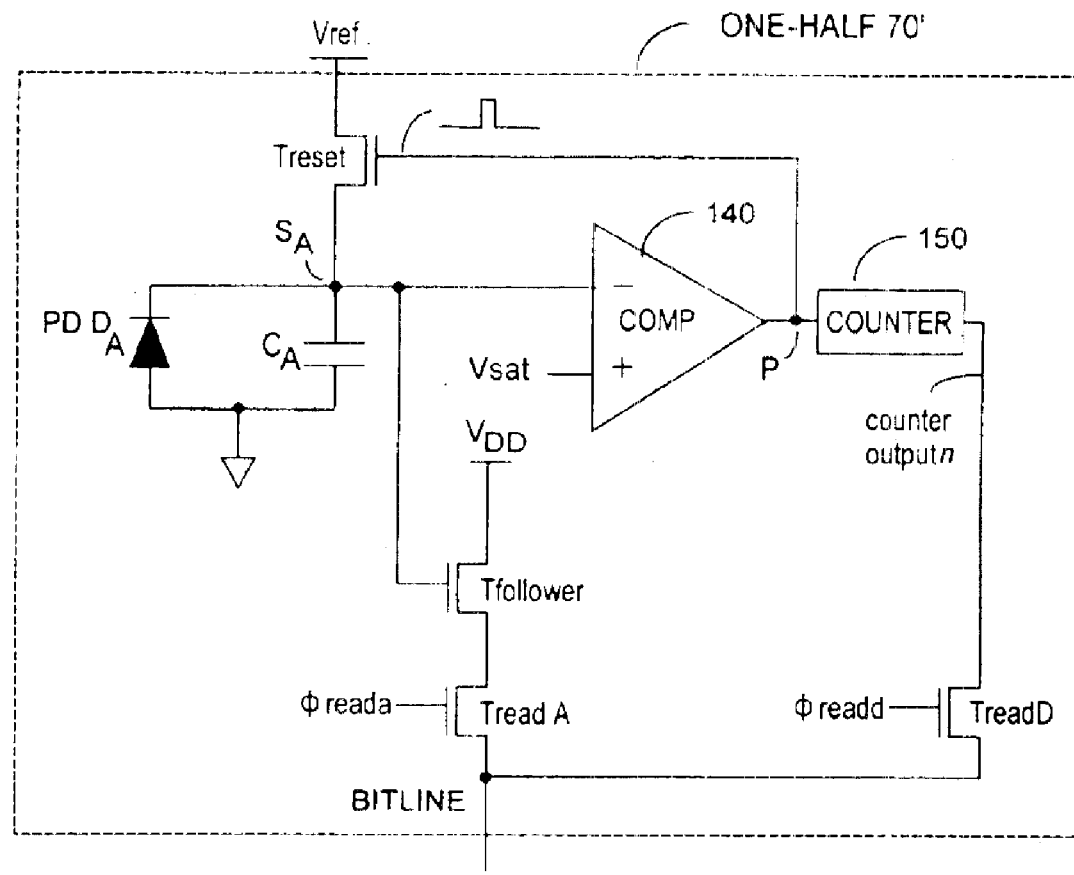
FIG. 3A depicts one-half of a self-resetting differential pixel detector according to an embodiment of the present invention.

FIG. 3A depicts one-half of differential pixel detector 70', where it is understood that system 10 in FIG. 1 might now employ an array 60 of rows and columns of differential pixel detectors 70' in lieu of prior pixel detectors 70. In FIG. 3A, only one of the two pixels is shown for ease of illustration, namely photodetector $D_A$ (denoted PD $D_A$). Associated with each photodetector in the pixel is a capacitor, $C_A$ being associated with $D_A$, where $C_A$ can be the capacitance inherent with $D_A$, and/or a discrete capacitor. In a conventional configuration, in the presence of a signal, typically ambient light, the voltage across $C_A$ would decrease until a saturation voltage $V_{sat}$ was attained, at which point an output signal from $D_A$ would be meaningless.

Figure 3B:
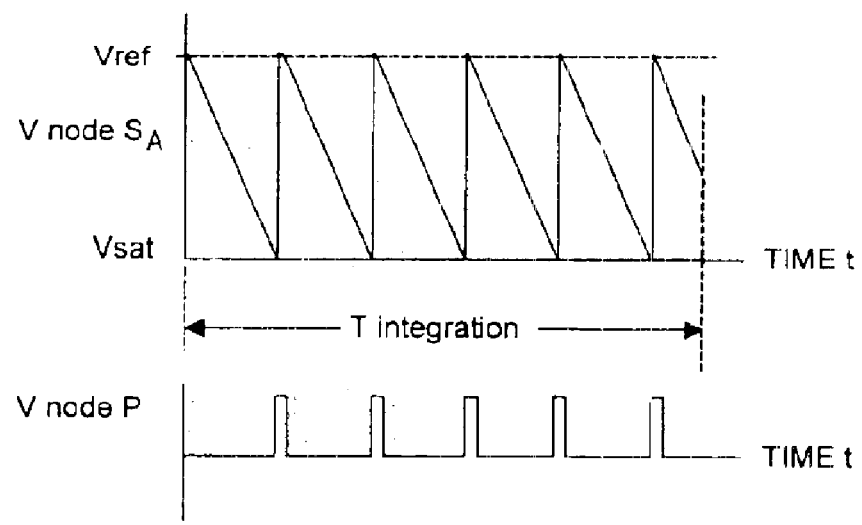
FIG. 3B depicts waveforms present in the detector of FIG. 3A, according to an embodiment of the present invention.

But as shown by the waveforms in FIG. 3B, the voltage at node $S_A$, e.g., the voltage across $C_A$ and across $D_A$, is prevented from exceeding $V_{sat}$ by resetting the node voltage to a fixed reference $V_{ref}$ whenever $V_{sat}$ is attained. Each differential pixel detector 70' includes two photodiodes and two capacitors, and each capacitor-photodiode node is independently reset to $V_{ref}$ as soon as the voltage across either capacitor reaches $V_{sat}$.

In FIG. 3A, a comparator 140 compares the voltage signal from photodiode $D_A$ present at node $S_A$ to $V_{ref}$. As soon as the $S_A$ potential reaches $V_{ref}$, comparator 140 changes state, going from low-to-high for the configuration shown. Thus when $VS_A > V_{sat}$, the output from comparator 140 turns-on a reset transistor $T_{reset}$ coupled between node $S_A$ and $V_{ref}$. The potential $VS_A$ at node $S_A$ is reset by being pulled from $V_{sat}$ to $V_{ref}$. The desired result is that overall dynamic range of pixel detector 70' is increased.

Returning to FIG. 3A and 3B, the output from comparator 140 (node P) is also input to a counter 150 that essentially will count the number of resets that occur for the detector. It is understood that as FIG. 3A depicts half of a differential pixel detector, there will be two comparators, two counters, and two sets of switching transistors for each differential pixel detector 70'. The photodiode signal at node $S_A$ is coupled via a high input impedance voltage follower transistor $T_{follower}$, whose output is read via a bitline when a $\Phi_{readA}$ signal goes high (for the configuration shown). An additional row selection transistor $T_{readD}$ is coupled between the output from counter 150 and the bitline signal, and is turned on when a $\Phi_{readD}$ signal goes high (for the configuration shown). Note that a feedback path exists between the comparator output and the gate for reset transistor $T_{reset}$. Those skilled in the art will appreciate that means other than the above described solid state switches, comparators, counters, etc., may be used to implement similar embodiments of the present invention.

Referring briefly to FIG. 1, optical energy source 40 typically outputs a pulse train of optical energy, which energy may be modulated, for example according to the '496 patent. The pulse train will have a period between adjacent output pulses. Within differential detector 70', the maximum period of integration is made less than the period between adjacent pulses of optical energy emitted by source 40. Referring back to FIGS. 3A and 3B, during integration in the present of strong ambient light, sunlight perhaps, the voltage at node $S_A$ across $C_A$ continues to decrease in magnitude until $V_{sat}$ is reached. At that moment, comparator 140 changes states, emitting a short output pulse that is present at node P. This pulse turns-on reset transistor $T_{reset}$ for a short time, causing $C_A$ to be again reset to voltage $V_{ref}$. Such reset is self-triggering, and can occur multiple times during the integration interval. The total number of such resets is recorded by counter 150, there being one counter for each of the two photodiode detectors in a differential pixel detector 70'.

At the end of the integration time, the counter value (n) and the final voltage $V_{final}$ on capacitor $C_A$ are read-out separately by turning-on $T_{readD}$ and $T_{readA}$, respectively. FIG. 3A is conceptual in that while counter 150 is shown being read-out as though its counter n were an analog value, in practice the digital counter will be read-out with a bus. The signal waveforms for node $S_A$ and the comparator output at node P are shown in FIG. 3B. Note that the effective voltage swing on node $S_A$ is $V_{swing} = n(V_{ref} - V_{sat}) + V_{final}$, which is n times larger than the maximum voltage swing $(V_{ref} - V_{sat})$ of known differential sensors. Thus using the self-resetting configuration of FIG. 3A, capacity is extended by n times, where n is the number of self-resets occurring during integration. The resultant extended maximum charge capacity for the photodiode enables the pixel sensor to detect differential mode signals even in the present of very strong ambient light.

Figure 3C:
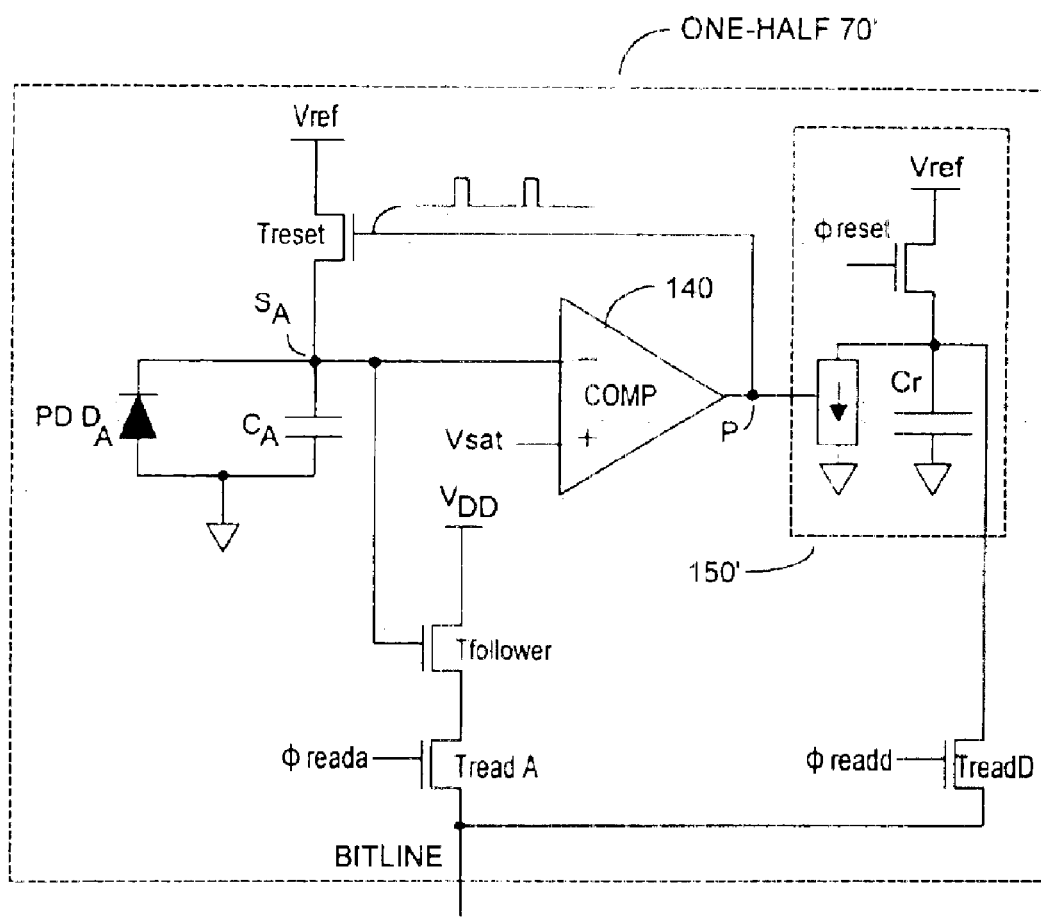
FIG. 3C depicts one-half of a self-resetting differential pixel detector implemented with an analog counter, according to an embodiment of the present invention.

While FIG. 3A has been described with respect to use of a counter 150 that operates digitally, the role of counter 150 can instead be implemented in analog fashion. FIG. 3C depicts such an implementation, in which an analog charge pump products an analog voltage value proportional to n. Such an analog circuit can be implemented using small area on an IC, e.g., IC 30 in FIG. 1, where conventional detectors 70 are replaced by detectors 70' according to the present invention.

In FIG. 3C, a current source changes voltage across a capacitor $C_r$, where each time a reset pulse (of fixed duration) is generated by comparator 140, the current source is turned on. Thus for each comparator reset pulse, a fixed amount of charge is injected into capacitor $C_r$, altering the voltage across the capacitor by $\Delta V_r$. At the end of the integration time, the voltage on capacitor Cr changes by an amount equal to $\Delta V_r$, times the number of reset pulses n that occurred during integration. It is possible to determine n by $n = (V_{ref} - V_r)/\Delta V_r$. Note that capacitor $C_r$ is also initialized to $V_{ref}$ when the photodetector is initialized. If desired, an initial voltage other than $V_{ref}$ could be used for capacitor $C_r$.

In FIG. 3C, photodetector $D_A$ can be reset by using the non-inverting input of comparator 140, which input normally is set to $V_{sat}$. But this non-inverting input can be used to perform an initial (frame) reset before integration. For example, during the initial reset period this input can be switched to $V_{DD}$, which will cause the comparator to output a pulse at node P that resets $T_{reset}$ and thus resets photodetector $D_A$ and its associated capacitor $C_A$. Thereafter the non-inverting node of comparator 140 can be returned to $V_{sat}$ to remain at that potential until the next (frame) reset. By judiciously making voltage $V_{sat}$ low, all photodetectors are simultaneously reset, thus removing the need for a separate reset signal.

Figure 4A:
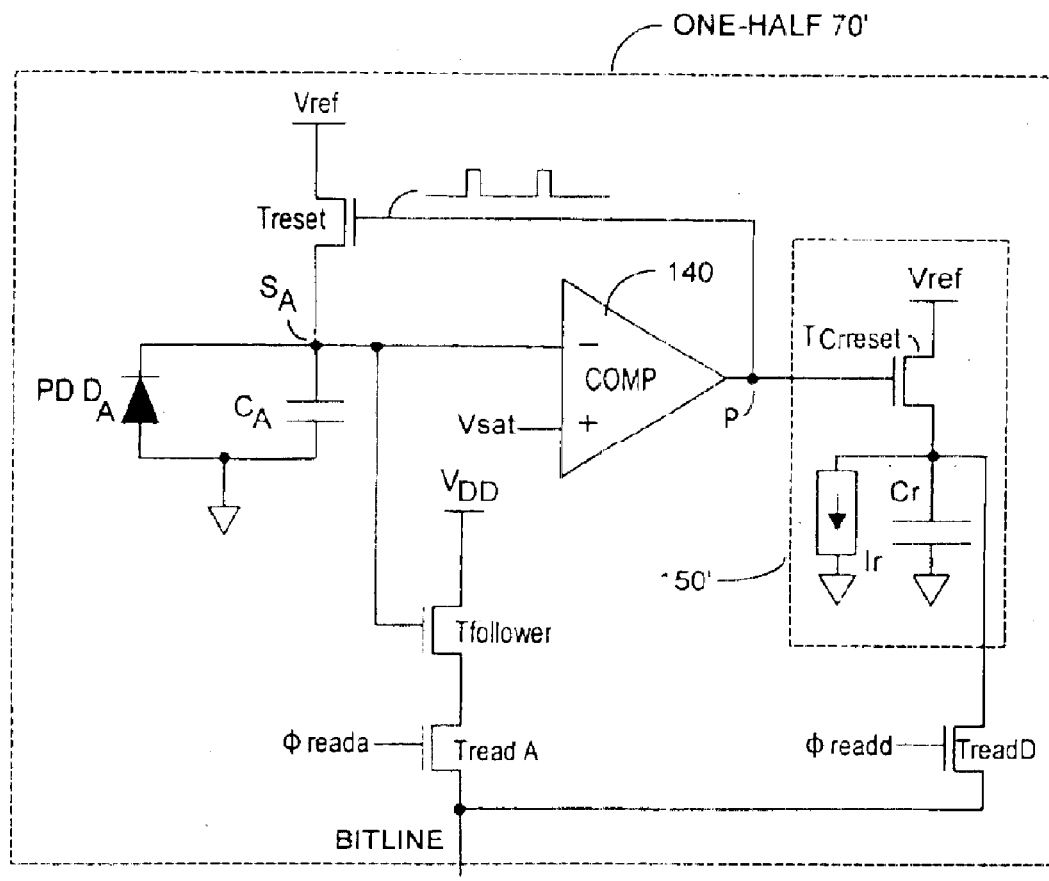
FIG. 4A depicts one-half of a self-resetting differential pixel detector using an analog counter with reset, according to an embodiment of the present invention.
Figure 4B:
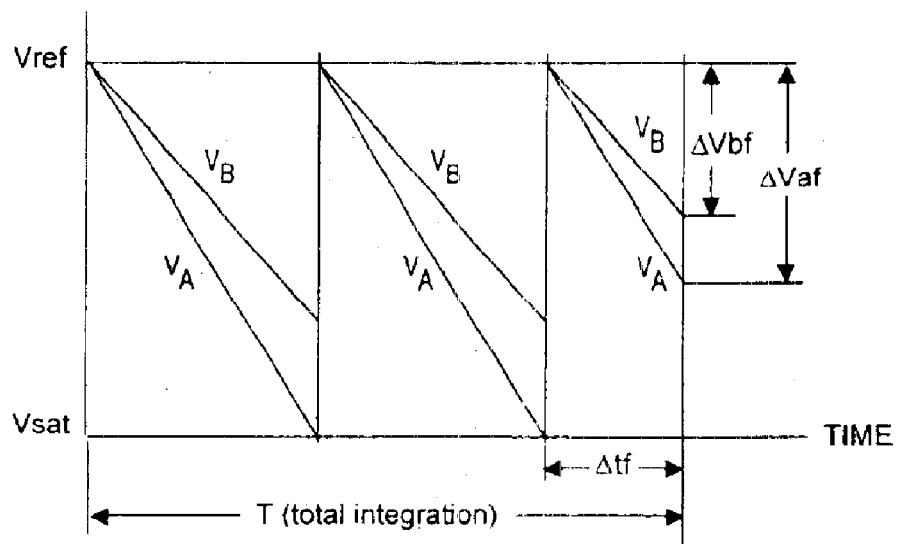
FIG. 4B depicts waveforms for a differential time to saturation counter as shown in FIG. 4A, according to an embodiment of the present invention.

Turning now to FIGS. 4A and 4B, an embodiment of a differential comparator is described in which a differential time to saturation counter is employed. In the block diagram of FIG. 4A a single detector PD $D_A$ is shown, although it is understood that a complete differential pixel detector 70' will comprise two detector diodes (or the like), two comparators, a counter, and associated reset and read-out transistors. In FIG. 4A, while counter 150' is shown implemented with analog components, a counter could instead be implemented to function digitally.

At start of integration, counter 150' starts counting to measure the time since the last reset to $V_{ref}$. In the following discussion it will be assumed that the magnitude of incoming ambient light does not change substantially during the integration time. Two scenarios will be considered: ambient light is strong, and ambient light is not very strong.

If the ambient light is strong, each photodetector $D_A$ and $D_B$ ($D_B$ not shown) will reach $V_{sat}$ multiple times during one integration period. In this case, every time either photodetector reaches $V_{sat}$ the photodetectors and counter 150' are simultaneously reset. At the end of the integration period, each photodetector will be at a determinable voltage level, which level will likely be different for each detector. Further, at the end of the integration period, the counter will have stored the time ($\Delta tf$) since the last reset required for the photodetectors to attain these final voltage levels. Since each photodetector end-of-integration voltage level is known, as is the time $\Delta tf$, the slope of the voltage curves for each photodetector and the number of resets that should have occurred during integration can be determined; see FIG. 4B. Note at the right-hand side of FIG. 4B that the final photodiode voltages are ($V_{ref}-\Delta V_{af}$) and ($V_{ref}-\Delta V_{bf}$) for photodiodes $D_A$ and $D_B$ respectively. Subtracting these magnitudes from $V_{ref}$ yields $\Delta V_{af}$ and $\Delta V_{bf}$. The total swing can be calculated as follows:

$$V_{swing-a} = \Delta V_{af} T/\Delta tf \qquad \text{eq. (3):}$$

$$V_{swing-b} = \Delta V_{bf} T/\Delta tf \qquad \text{eq. (4)}$$

where T is the total integration time, which is known.

If the ambient light is not strong, at the end of the integration time T, the counter value will be equal to the integration time, and the voltages across the photodiodes $D_A$ and $D_B$ will represent all that the photocharge each pixel could collect during the whole integration time. In this case, no further calculation is needed to determine the total voltages, since it follows from T=$\Delta tf$ that:

$$V_{swing-a} = \Delta V_{af} \qquad \text{eq. (5):}$$

$$V_{swing-b} = \Delta V_{bf} \qquad \text{eq. (6):}$$

Once the relevant times and photodiode voltages are read-out, an external computation unit, perhaps microprocessor 90 in system 10 (see FIG. 1) or pure logic circuitry can calculate to provide the differential signal.

As noted, in FIG. 4A an analog equivalent of a digital resettable counter 150' is used, in which a charge pump can be used to measure $\Delta tf$. A charge pump capacitor $C_r$ is reset by transistor $Tc_{reset}$ each time photodiode voltage reaches $V_{sat}$. Thus at the end of time T, the voltage on $C_r$ is proportional to the time from the last reset to the end of integration. Assuming the constant current supplied to $C_r$ is $I_r$, then the final voltage on $C_r$ will be $V_r = V_{ref} - I_r \cdot \Delta tf/C_r$ and $\Delta tf$ can be determined as $\Delta tf = (V_{ref} - V_r) \cdot C_r/I_r$. In the above descriptions, two independent counters are present. However since only the counter causing the most recent reset is of use, both counters can be combined into a single counter. This single counter and the reset for both halves of the pixel detector could be controlled by the logical OR of both comparators.

As noted, capacitor $C_r$ is initialized at the beginning of integration along with the photodetector. As with the self-reset method, the non-inverting input of comparator 140 may be switched to $V_{DD}$ (rather than to $V_{sat}$ during integration) to reset pixel 70' (e.g., both photodetectors and $C_r$). By judiciously making voltage $V_{sat}$ low, all photodiodes are simultaneously reset, thus removing the need for a separate reset signal.

Figure 5A:
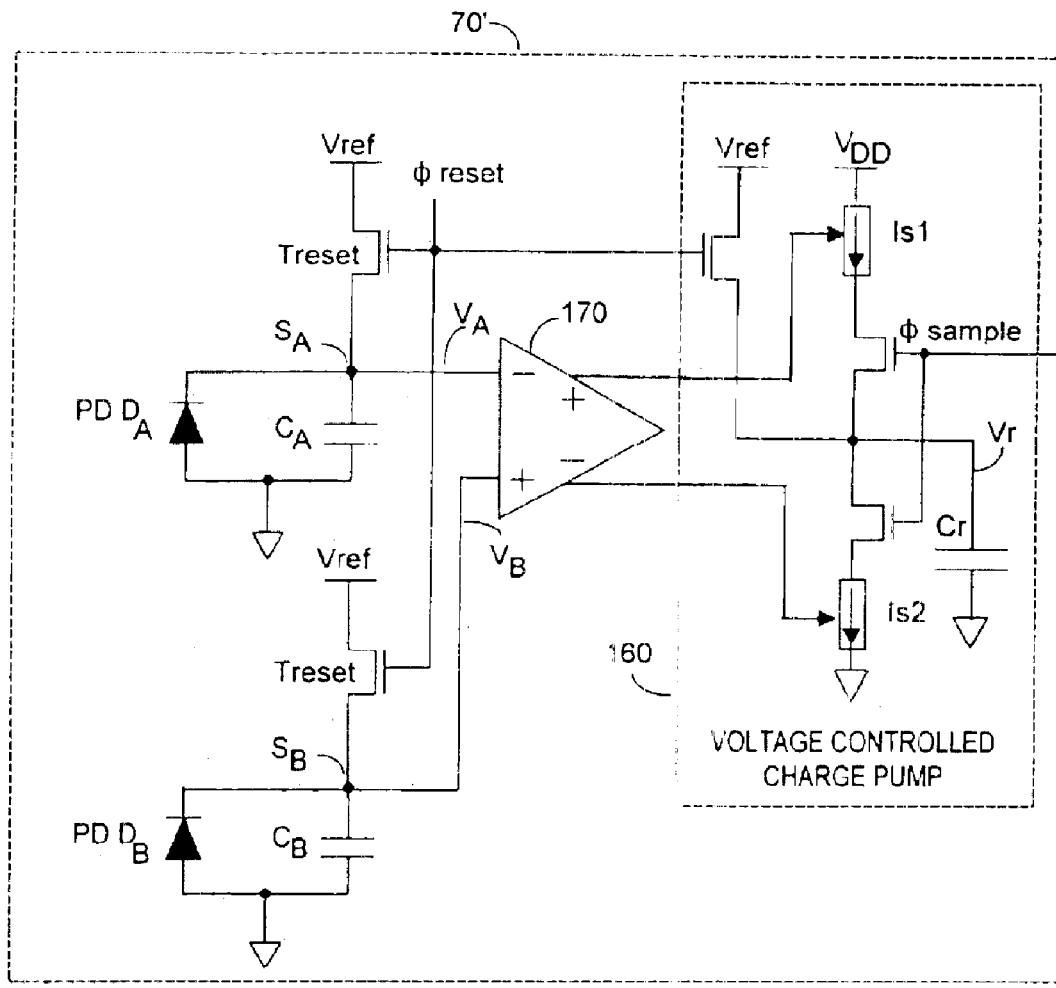
FIG. 5A depicts a differential pixel detector using a controlled charge pump, according to an embodiment of the present invention.
Figure 5B:
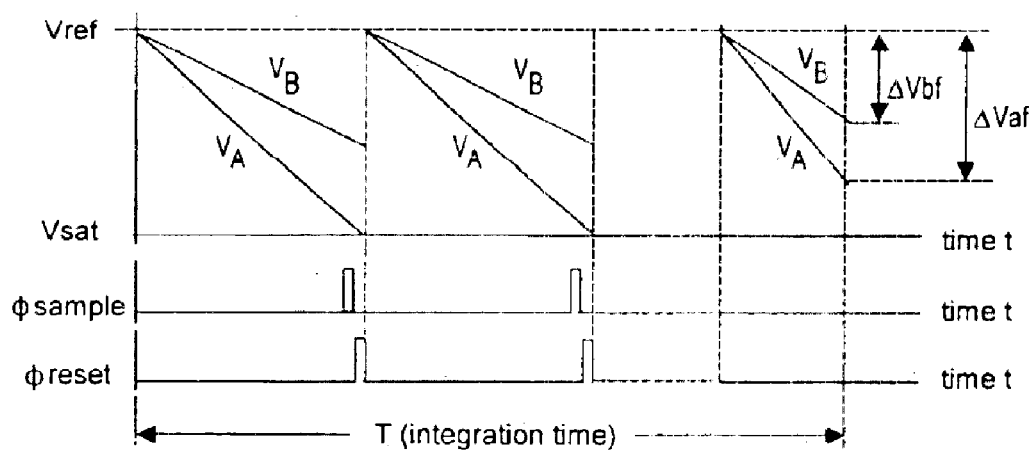
FIG. 5B depicts waveforms present in the detector of FIG. 5A, according to an embodiment of the present invention.

Turning now to FIGS. 5A and 5B an embodiment of the present invention is shown in differential pixel detector 70' includes a voltage controlled charge pump 160 to record voltage difference between the two differential photodetectors $D_A$ and $D_B$ before they are saturated by high common mode signal. Once the photodetector voltage difference has been recorded on a third capacitor $C_r$, photodetectors $D_A$ and $D_B$ and their associated capacitors ($C_A$, $C_B$) can be reset by the relevant reset transistors, and integration starts again.

In FIG. 5A, charge pump 160 includes two voltage controlled current sources $I_{s1}$, $I_{s2}$ and a capacitor $C_r$. Although the voltage difference between photodetectors $D_A$ and $D_B$ may be monitored continuously by differential amplifier 170, charge pump 160 is only turned-on for a fixed period of time. In this fashion, charge accumulated on capacitor $C_r$ during each sample is proportional to the voltage difference. After each sample, the differential photodetector is reset and a new integration cycle starts. The sampling frequency preferably depends upon incoming light intensity, e.g., optical energy falling upon photodetectors $D_A$ and $D_B$, which intensity can be estimated. The final charge on $C_r$ is the summation of the samples and is proportional to the total voltage difference between the differential photodetectors. FIG. 5B depicts control signal and voltage waveforms at various nodes in the configuration of FIG. 5A.

At the end of integration, three voltage values are read-out from pixel 70', namely $V_a$ (voltage across $D_A$), $V_b$ (voltage across $D_B$), and $V_r$ (voltage across capacitor $C_r$). Given these quantities, one can calculate the resulting differential voltage $V_{swing-a} - V_{swing-b}$ as follows. Looking at FIG. 5B, it is seen that $\Delta V_{af} = V_{ref} - V_a$ and that $\Delta V_{bf} = V_{ref} - V_b$. The differential voltage is then given by $V_{swing-a} - V_{swing-b} = \Delta V_{af} - \Delta V_{bf} + f(V_r)$, where $f(V_r)$ is a linear function of $V_r$.

This linear function $f(V_r)$ is obtained by writing $V_r$, as $V_r = V_{ref} + n \cdot k \cdot (V_a - V_b)$. As noted, $V_{ref}$ is the initial voltage for capacitor $C_r$ (e.g., the reset voltage for photodetectors $D_A$, $D_B$), n is the number of sample/reset cycles, and k is a constant determined from the circuit of FIG. 4A, and represents how much voltage change occurs on $C_r$ for given a unit voltage change in ($V_a - V_b$). The amount contributing to $V_{swing-a} - V_{swing-b}$ is $n \cdot (V_a - V_b)$, which is equal to $n \cdot (V_a - V_b) = (V_r - V_{ref})/k = f(V_r)$. In summary the final differential voltage is calculated from known quantities, according to $V_{swing-a} - V_{swing-b} = V_b - V_a + (V_r - V_{ref})/k$. Common mode voltage can also be estimated from $\Delta V_{af}$ and $\Delta V_{bf}$ since the time between the last reset and the end of integration is known.

It is possible to automatically generate the $\Delta_{sample}$ or $\Delta_{reset}$ signals within each pixel 70', by providing some additional circuitry. One can use two comparators to compare $S_A$, $S_B$ node potentials with $V_{sat}$, and the logical OR can be taken of the comparator outputs to yield the $\Delta_{sample}$ signal. Thus as soon as either photodiode potential reaches $V_{sat}$, $\Delta_{sample}$ goes high. If desired, $\Delta_{reset}$ can be a delayed version of $\Delta_{sample}$. Such a self-resetting configuration would use two comparators, an OR gate, and a delay element that could be a simple RC delay.

Figure 6A:
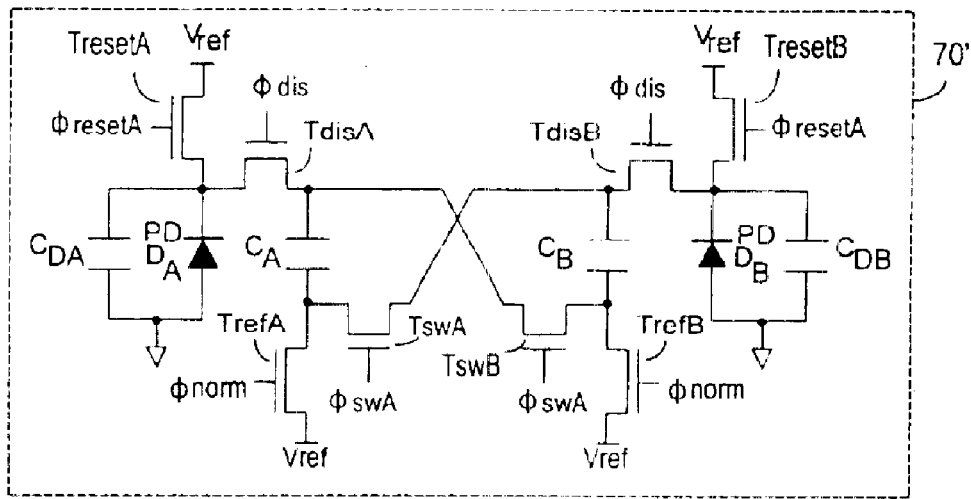
FIG. 6A depicts a common mode resettable differential pixel detector, according to an embodiment of the present invention.

Turning now to FIG. 6A, an embodiment of a differential pixel detector 70' is shown in which during reset operation capacitors acquire exactly the same charge in each half of the configuration. By adding exactly the same charge to each half of the configuration, common mode contribution is essentially removed and differential mode contribution is preserved. Such an approach offers several advantages. For example, extra resets do not affect the system operation, and the pixel detector may be reset even if it is not discharged. Further, capacitor or component mismatch has substantially no effect on the accuracy of the reset. In addition, it can be shown that common mode reset generates no KT/C noise in the differential domain. The only resulting KT/C contribution appears in common mode where it is unimportant.

For ease of illustration, FIG. 6A does not depict $Q_A$, which is the sum of the charge on the top plate of capacitors $C_A$ and $C_{DA}$, or $Q_B$, which is the sum of the charge on the top plate of capacitors $C_B$ and $C_{DB}$. In operation, the configuration of FIG. 6A preserves the differential quantity $Q_A - Q_B$ during the common mode reset operation, although the common mode quantity, $(Q_A + Q_B)/2$, is changed at each reset. What occurs is that after a reset, the quantity $(Q_A+Q_B)/2$ is moved closer to some constant $Q_{resetO}$. Thus in contrast to other reset approaches, additional resets have no adverse impact in FIG. 6A as they simply move the operating point for $(Q_A+Q_B)/2$ even closer to $Q_{resetO}$.

In normal operation switching transistors $T_{swA}$ and $T_{swB}$ are open, while transistors $T_{vrefA}$ and $T_{vrefB}$, and $T_{disA}$ and $T_{disB}$ are closed. Initially photodetector diodes $D_A$ and $D_B$ are reset to $V_{ref}$ via transistors $T_{resetA}$ and $T_{resetB}$, but during integration transistors $T_{resetA}$ and $T_{resetB}$ remain open. As optical energy impinges on photodiode $D_A$ it discharges its parasitic capacitor $C_{DA}$ as well as capacitor $C_A$, while photodiode $D_B$ discharges its parasitic capacitor $C_{DB}$ as well as its capacitor $C_B$. Initial reset is achieved though transistors $T_{resetA}$ and $T_{resetB}$, which initialize the circuit at potential $V_{ref}$, although other potenenial levels may instead be used.

Figure 6B:
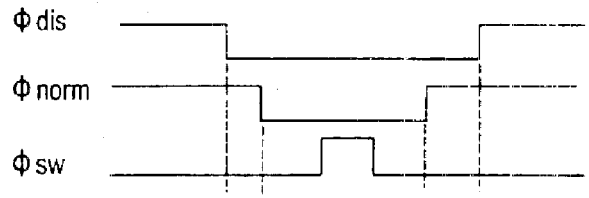
FIG. 6B depicts control waveforms present in the detector of FIG. 6A, according to an embodiment of the present invention.

During common mode reset, signal $\Phi_{resetA}$ remains low, while the other control signals operate as shown in FIG. 6B. During operation of pixel 70', the following steps take place:

(1) First, capacitors $C_A$ and $C_B$ are decoupled from associated photodiodes $D_A$ and $D_B$ by bring the $\Phi_{dis}$ signal low, which opens discharge transistors $T_{disA}$ and $T_{disB}$ going low. This operation does not change the differential charge quantity $Q_A-Q_B$, and no KT/C noise is introduced on $Q_A-Q_B$.

(2) Next, when control signal $\Phi_{norm}$ goes low, the bottom plates of capacitors $C_A$ and $C_B$ are decoupled from $V_{ref}$ by the opening of transistors $T_{refA}$ and $T_{refB}$. The quantity $Q_A-Q_B$ remains unaffected, even in terms of KT/C.

(3) When the control signal $\Phi_{switch}$ goes high, capacitors $C_A$ and $Q_B$ redistribute their charge. Let $Q_{CA}$ be the charge on capacitor $C_A$ and let $Q_{CB}$ be the charge on capacitor $C_B$. If capacitors $C_A$ and $C_B$ are now shorted together in parallel the total charge quantity $Q_{CA}+Q_{CB}$ would be preserved. However since $C_B$ is connected to $C_A$ inverted, the quantity $Q_{CA}-Q_{CB}$ is preserved during this operation. Since no switches are opened no KT/C arises from this step.

(4) When the control signal $\Phi_{swA}$ goes low; a KT/C uncertainty appears in the charge redistribution, but this KT/C appears as common mode on the quantities $Q_{CA}$ and $Q_{CB}$. Any charge taken from $Q_{CA}$ shows up exactly on $Q_{CB}$ but with a minus sign. Thus after switches $T_{swA}$ and $T_{swB}$ open, $Q_{CA}'=Q_{CA}+\text{Noise}_{KTC}$, and $-Q_{CB}'=-Q_{CB}'-\text{Noise}_{KTC}$. Thus there is no KT/C noise on $Q_{CA}'-Q_{CB}'=Q_{CA}-Q_{CB}+(\text{Noise}_{KTC}-\text{Noise}_{KTC})$.

(5) Next, when control signal $\Phi_{norm}$ goes high again the differential charge $Q_A-Q_B$ is unchanged.

(6) Finally, when control signal $\Phi_{dis}$ goes high, $Q_A-Q_B$ is unchanged.

If desired some of the above steps may be combined for simplicity. For example steps 5 and 6 may occur simultaneously or even out of sequence. Steps 1,2 and 5,6 clearly do not affect $Q_A-Q_B$, and it was demonstrated that steps 3 and 4 do not affect $Q_{CA}-Q_{CB}$. Thus, steps 1 through 6 do not affect $Q_A-Q_B$. In operation, the generation of the various control signals can be handled by microprocessor 90 in system 10 in FIG. 1, where it is understood that array will comprise differential pixels 70', according to the present invention.

Note that no assumption as to closeness of component matching was made in the above analysis, and the conclusions reached remain irrespective of the values of capacitors $C_A$, $C_B$, $C_{DA}$, and $C_{DB}$. Additionally the linearity of the capacitors does not affect performance, and the configuration shown in FIG. 6A will function with capacitors that are mismatched or even nonlinear.

Consider now the common mode voltage on photodiodes $D_A$ and $D_B$ after reset. Within reasonable bounds, the exact value of the common mode voltage is not critical. Although an analysis can be carried out for almost any capacitor values, for simplicity of explanation let it be assumed that $C_A=C_B$ and $C_{DA}=C_{DB}$.

Since it is small, let KT/C reset noise be ignored. Thus after step 5 if $V_{CA}$ (the voltage across capacitor $C_A$) and if $V_{CB}$ (the voltage across capacitor $C_B$) have the relation $V_{CA}=-V_{CB}$, the voltage on the top plate of $C_A$ is $(V_{ref+VCA})$ and the voltage on the top plate of $C_B$ is $(V_{ref}-V_{CA})$.

As noted, charge difference $Q_A-Q_B$ is preserved in the configuration of FIG. 6A. Assuming that $C_A=C_A$ and $C_{DA}=C_{DB}$ it can be shown that the voltage difference $V_{DA}-V_{DB}$ on the photodiodes is also preserved, and that is voltage is $V_{DA}-V_{DB}=2V_{CA}=-2V_{CB}$, after step 5. Thus following step 5, $V_{DA}$ and $V_{DB}$ must differ from the top plate voltages on capacitors $C_A$ and $C_B$ by only a constant K.

$$V_{DA}=V_{ref}+V_{CA}+K \qquad \text{eq. (7):}$$

$$V_{DB}=V_{ref}+V_{CB}+K=V_{ref}-V_{CA}+K \qquad \text{eq. (8):}$$

$$V_{DA}+V_{DB}=V_{ref}+V_{CA}+K+V_{ref}-V_{CA}+K=2(V_{ref}+K) \qquad \text{eq. (9):}$$

After step 6 because of charge redistribution the new voltages are:

$$V'_{DA} = [C_{DA} \cdot V_{DA} + C_A \cdot (V_{ref} + V_{CA})]/(C_{DA} + C_A) \qquad \text{eq. (10):}$$

$$= [C_{DA} \cdot (V_{ref} + V_{CA} + K) + C_A \cdot (V_{ref} + V_{CA})]/(C_{DA} + C_A) \qquad \text{eq. (11):}$$

$$= [(V_{ref} + V_{CA}) + C_{DA} \cdot K/(C_{DA} + C_A)], \text{ and} \qquad \text{eq. (12):}$$

$$V'_{DB} = [C_{DB} \cdot V_{DB} + C_B \cdot (V_{ref} + V_{CB})]/(C_{DB} + C_B) \qquad \text{eq. (13):}$$

$$= [C_{DB} \cdot (V_{ref} + V_{CB} + K) + C_B \cdot (V_{ref} + V_{CB})]/(C_{DB} + C_B) \qquad \text{eq. (14):}$$

$$= [(V_{ref} + V_{CB}) + C_{DB} \cdot K/(C_{DB} + C_B)] \qquad \text{eq. (15):}$$

$$= [(V_{ref} - V_{CA}) + C_{DA} \cdot K/(C_{DA} + C_A)] \qquad \text{eq. (16):}$$

Thus the sum $V_{DA}'+V_{DB}'$ then becomes $$V_{DA}'+V_{DB}'=[(V_{ref}+V_{CA})+C_{DA} \cdot K/(C_{DA}+C_A)]+[(V_{ref}-V_{CA})+C_{DA} \cdot K/(C_{DA}+C_A)]=2 \cdot [V_{ref}+K \cdot C_{DA}/(C_{DA}+C_A)] \qquad \text{eq. (17):}$$

Thus the sum $V_{DA}'+V_{DB}'$ is advantageously always closer to $2V_{ref}$ than to $V_{DA}+V_{DB}$. This demonstrates that with each reset in FIG. 6A, the common mode is brought closer to $V_{ref}$ by $K \cdot [1-C_{DA}/(C_{DA}+C_A)]=K \cdot C_A/(C_{DA}+C_A)$.

Figure 6C:
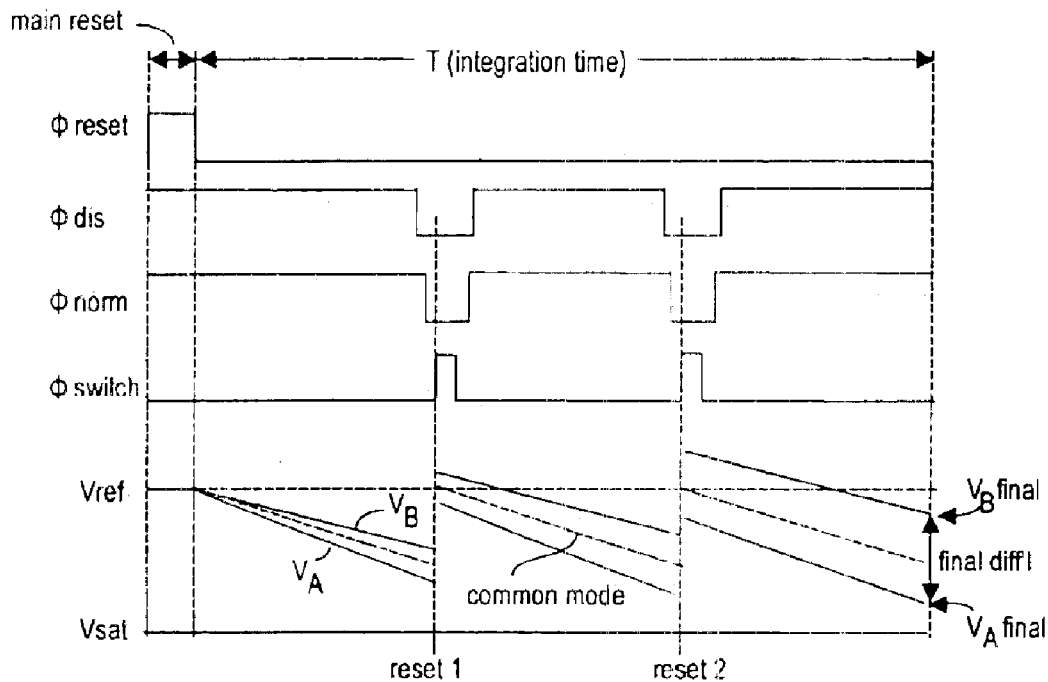
FIG. 6C depicts waveforms present in the detector of FIG. 6A over a two reset sequence, according to an embodiment of the present invention.

To recapitulate, for the embodiment of FIG. 6A, reset operation has the desired effect of centering the common mode about $V_{ref}$. Relevant waveforms for FIG. 6A are shown in FIG. 6C. As a consequence, a reset can be applied without consideration of over-saturating or under-saturating the common mode for the pixel configuration. Thus in normal operation, reset can occur as often as desired without concern as to ill effects resulting from over or under saturation of the common mode.

Transistors $T_{disA}$ and $T_{disB}$ can be used as global shutters, thereby improving resilience to ambient light by stopping the effects of all light impinging on the differential pixel when the shutter is turned off. When $T_{disA}$ and $T_{disB}$ are off, capacitors $C_a$ and $C_b$ are decoupled from photodetectors $PD_{DA}$ and $PD_{DB}$ and therefore stop integrating the signal from $PD_{DA}$ and $PD_{DB}$. If the output of the pixel is chosen to be top plate of capacitors $C_A$ and $C_B$ then the output of the pixel will be frozen after $T_{disA}$ and $T_{disB}$ are turned-off, thereby providing the function of a global shutter.

Figure 6D:
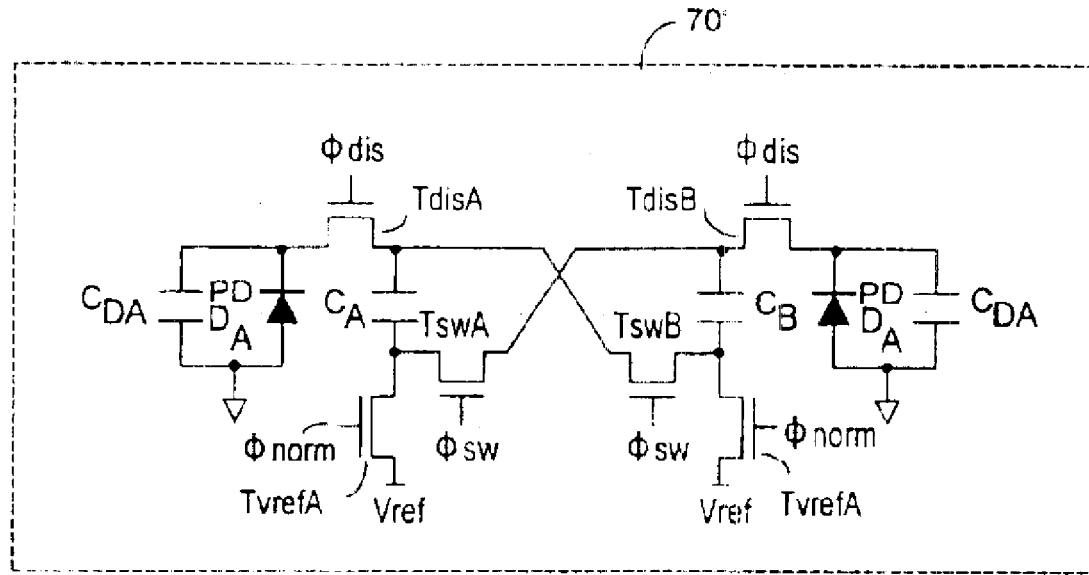
FIG. 6D depicts another configuration of a common mode resettable differential pixel detector, according to an embodiment of the present invention.

FIG. 6D depicts another embodiment of a capacitor common mode reset configuration for pixel 70', according to the present invention. Basic operation for the configuration of FIG. 6D is as described for the configuration of FIG. 6A. However, in FIG. 6D, initialization of voltages $V_{DA}$ and $V_{DB}$ across photodiodes $D_A$, $D_B$ respectively at the beginning of integration does not involve transistors $T_{resetA}$ and $T_{resetB}$ as was the case for the configuration of FIG. 6A. Instead, in FIG. 6D, reset is achieved by simultaneously turning-on transistors $T_{disA}$ and $T_{disB}$ with high control signals $\Phi_{dis}$, turning-on transistors $T_{swA}$ and $T_{swB}$ with high control signal $\Phi_{sw}$, and by turning-off transistors $T_{VrefA}$ and $T_{vrefB}$ with low control signal $\Phi_{norm}$. This has the effect of resetting photodetectors $PD_{DA}$ and $PD_{DB}$ to $V_{ref}$. Note that transistors $T_{disA}$ and $T_{disB}$ may be used as global shutters in this configuration.

Figure 6E:
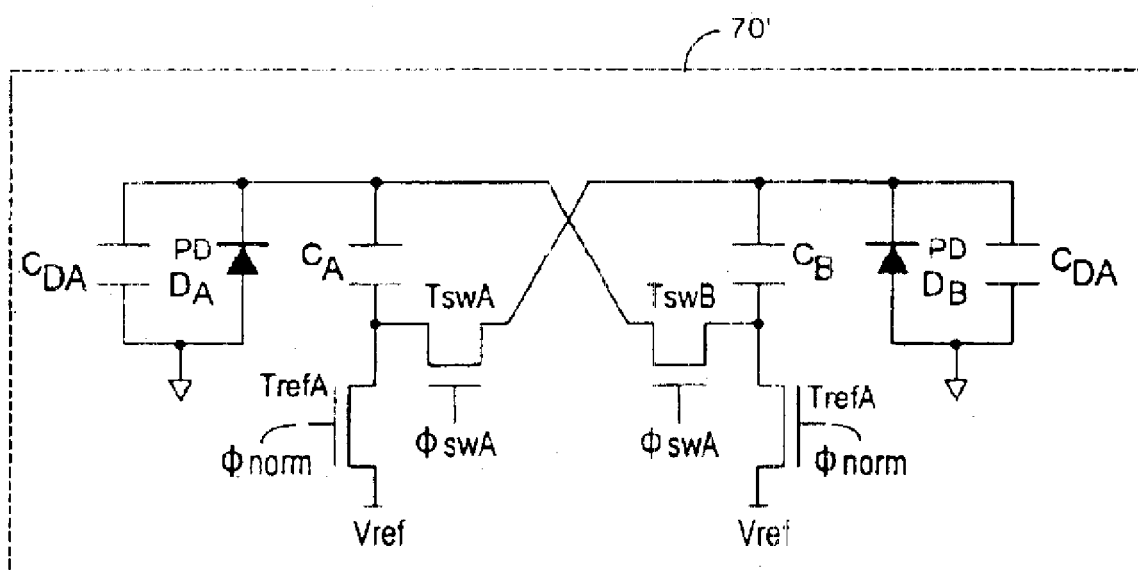
FIG. 6E depicts yet another configuration of a common mode resettable differential pixel detector, according to an embodiment of the present invention.

FIG. 6E depicts yet another embodiment for pixel 70', wherein discharge transistors $T_{disA}$ and $T_{disB}$ are eliminated. Indeed these discharge transistors could also be removed from the configurations of FIG. 6A and FIG. 6D. While these alternative configurations reduced common mode, unfortunately detector performance is diminished. This degradation results as each reset reduces some of the differential mode signal, and after a usually small number of resets, the differential signal is lost as a function of $C_{DA}/C_A$ and $C_{DB}/C_B$. Such embodiments may still find use in applications that do not require high precision, or where the number of resets is low, or where $C_{DA} << C_A$ and $C_{DB} << C_B$.

Figure 7A:
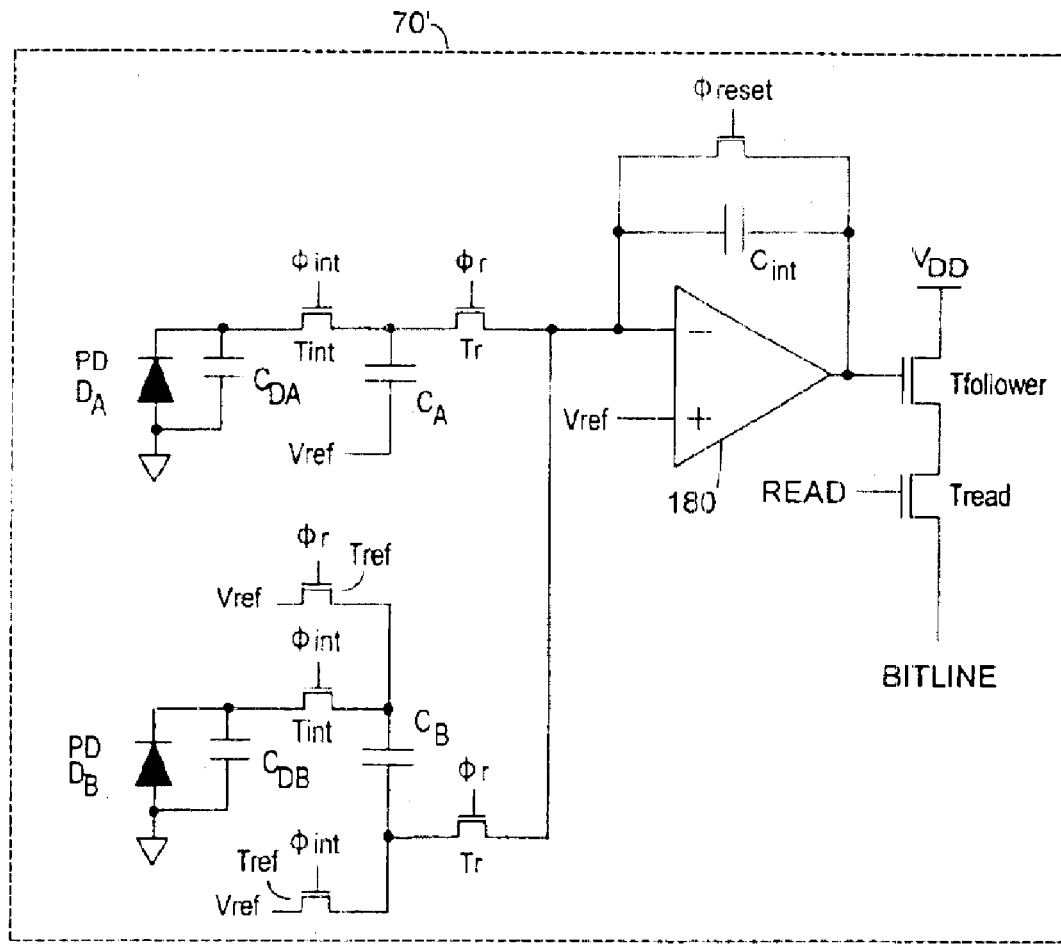
FIG. 7A depicts a common mode resettable differential pixel detector using charge integration, according to an embodiment of the present invention.
Figure 7B:
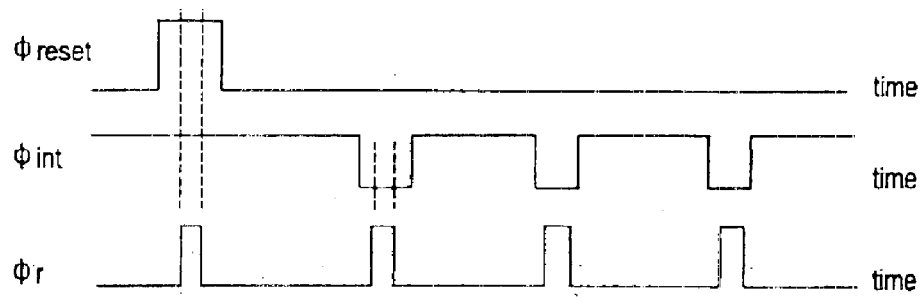
FIG. 7B depicts control waveforms for the embodiment of FIG. 7A, according to the present invention.

Turning now to FIGS. 7A and 7B, a configuration and waveforms for a differential pixel detector 70' is shown in which a charge integrator is used for differential signal integration and common mode reset. Integration is carried out by integrator 180 and integration capacitor $C_{int}$. During an initial frame reset, transistors controlled by $\Phi_{reset}$, $\Phi_r$, and $\Phi_{int}$ signals are all turned-on, and the voltages on photodetectors $D_A$ and $D_B$ are reset to $V_{ref}$.

During integration, transistors controlled by signal $\Phi_{int}$ are turned-on and transistors controlled by signals $\Phi_r$, $\Phi_{reset}$ are turned-off. Thus during integration, light induced photocurrent discharges photodiode parasitic capacitance $C_{DA}$, $C_{DB}$, as well as capacitors $C_A$ and $C_B$. As has been noted, the integrated signals contain both differential mode and common mode components. FIG. 7B depicts various control voltage waveforms used in the embodiment of FIG. 7A.

Next, in a common mode reset phase, control signal $\Phi_{int}$ goes low, causing transistors $T_{int}$ to decouple $C_A$ from $C_{DA}$ and to decouple $C_B$ from $C_{DB}$. Then control signal $\Phi_r$ goes high, turning-on transistors $T_r$ and charge in both $C_A$ and $C_B$ transfers to the integration capacitor $C_{int}$. Note that polarities of the charge transferred onto $C_{int}$ are opposite due to the arrangement of the $T_r$ switches.

The integrated charge on $C_{int}$ after the common mode reset can be expressed in terms of charge on $C_{DA}$, $C_{DB}$ before the common mode reset as:

$$Q_{int} = Q_{C_{DA}} - Q_{C_{DB}} \qquad \text{eq. (18):}$$

Therefore the common mode signal is cancelled while the differential signal is preserved, which is the desired result.

Preferably common mode reset is performed multiple times and is interleaved with the integration during the whole frame integration. During integration, the integrating operational amplifier 180 may be turned off to save power. The total number of common mode reset performed will depend on the intensity of ambient light. The final signal readout is the accumulated charge (hence voltage) on $C_{int}$.

While the charge integrator in the embodiment of FIG. 7A used a single-ended operational amplifier 180, a fully differential operational amplifier could be used, among other types of integration configurations.

In the embodiment of FIG. 7A, each differential pixel (e.g., each $D_A$ and $D_B$ photodiode pair) has its own integrator, e.g., 180. In an alternative embodiment, one can implement only integration capacitor $C_{int}$ within each pixel, and share operational amplifier 180 as well as switches associated with connecting $C_{int}$ to amplifier 180 among multiple pixels. This approach would require fewer transistors per pixel, allowing a higher fill factor to be achieved on the integrated circuit containing the detector system.

Figure 8A:
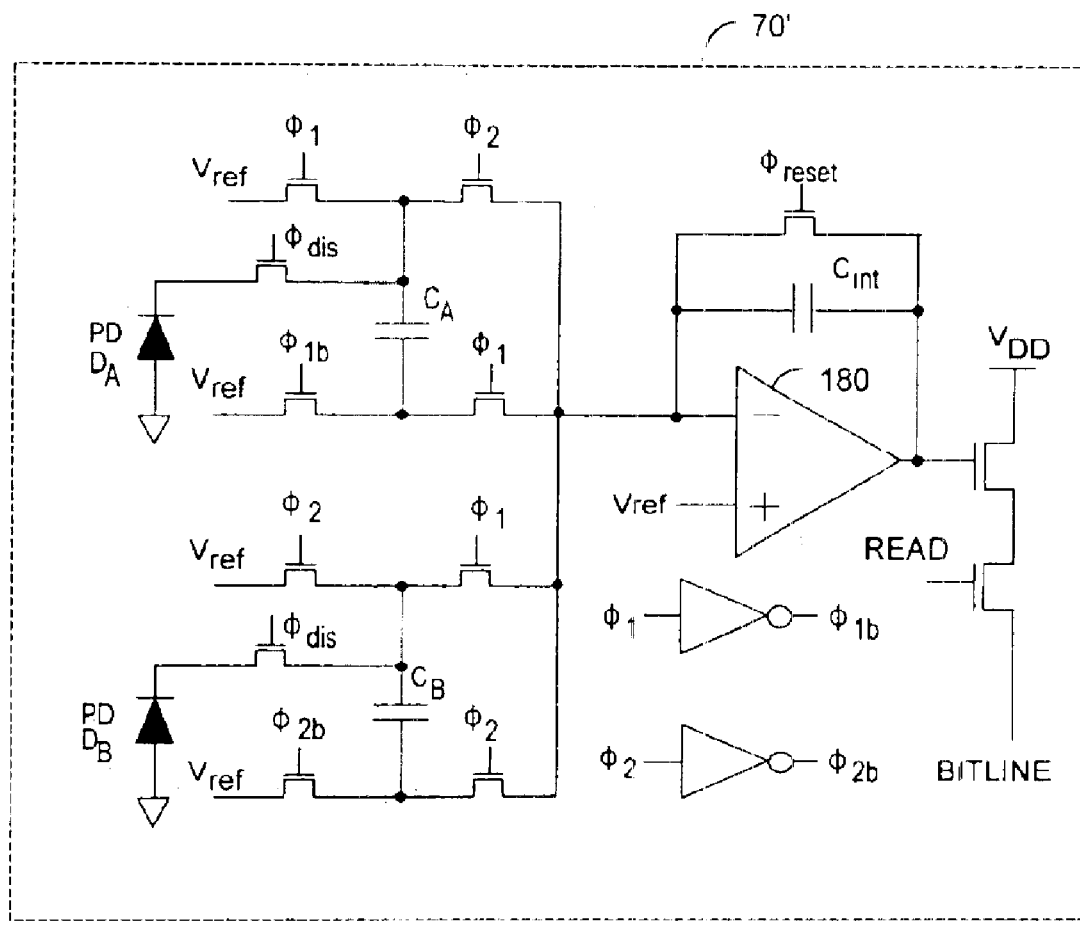
FIG. 8A depicts a common mode resettable differential pixel detector with component mismatch cancellation using charge integration, according to an embodiment of the present invention.

Turning now to FIG. 8A, an embodiment of a differential detector 170' is shown in which the common mode reset circuitry compensates for potential mismatch between components such as mismatched detector area between $D_A$ and $D_B$, mismatched tolerance between capacitors $C_A$ and $C_B$, as well as mismatched transistor sizes.

Figure 8B:
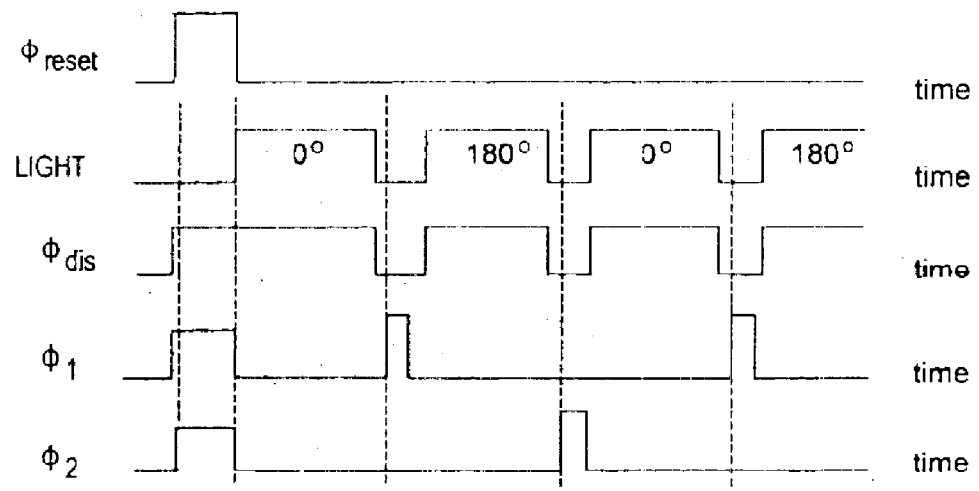
FIG. 8B depicts waveforms associated with the configuration of FIG. 8A, according to an embodiment of the present invention.

FIG. 8B depicts control waveforms found in an alternate embodiment of FIG. 8A. In this alternate embodiment, as shown in FIG. 8B, the phase of the optical energy waveform from emitter 40 (LIGHT) alternates between 0° and 180° with respect to the phase of a signal used to modulate the photodetectors. Thus, rather than use fixed charge transfer polarity as in the embodiment of FIG. 7B, polarity between $D_A$ and $D_B$ is switched synchronously in time with modulation of the light emitted from system 10 towards target object 20. The accumulated charge on integration capacitor $C_{int}$ at the end of frame integration is expressed as:

$$Q_{int} = (Q^1_{A,0} - Q^1_{B,0}) + (Q^1_{A,180} - Q^1_{B,180}) + \qquad \text{eq. (19):}$$
$$(Q^2_{A,0} - Q^2_{B,0}) + (Q^2_{A,180} - Q^2_{A,180}) + \ldots$$
$$= \sum_{i=1}^{n/2}(Q^i_{A,0} - Q^i_{B,0}) + \sum_{i=1}^{n/2}(Q^i_{A,180} - Q^i_{B,180})$$

where $Q_{A,0}$ represents the charge collected by detector $D_A$ with respect to 0° light phase, $Q_{B,0}$ represents the charge collected by detector $D_B$ with respect to 0° light phase, $Q_{A,180}$ represents the charge collected by detector $D_A$ with respect to 180° light phase, and $Q_{B,180}$ represents the charge collected by detector $D_B$ with respect to 180° light phase. As is apparent from the above equation, if the total number of common mode resets is n, then half of the final differential charge is collected from detector $D_A$ and half of the charge is collected from detector $D_B$. Another advantage of this embodiment is that KT/C noise associated with the transistor switches becomes common mode; therefore such noise is cancelled out from the final differential signal value.

Figure 9A:
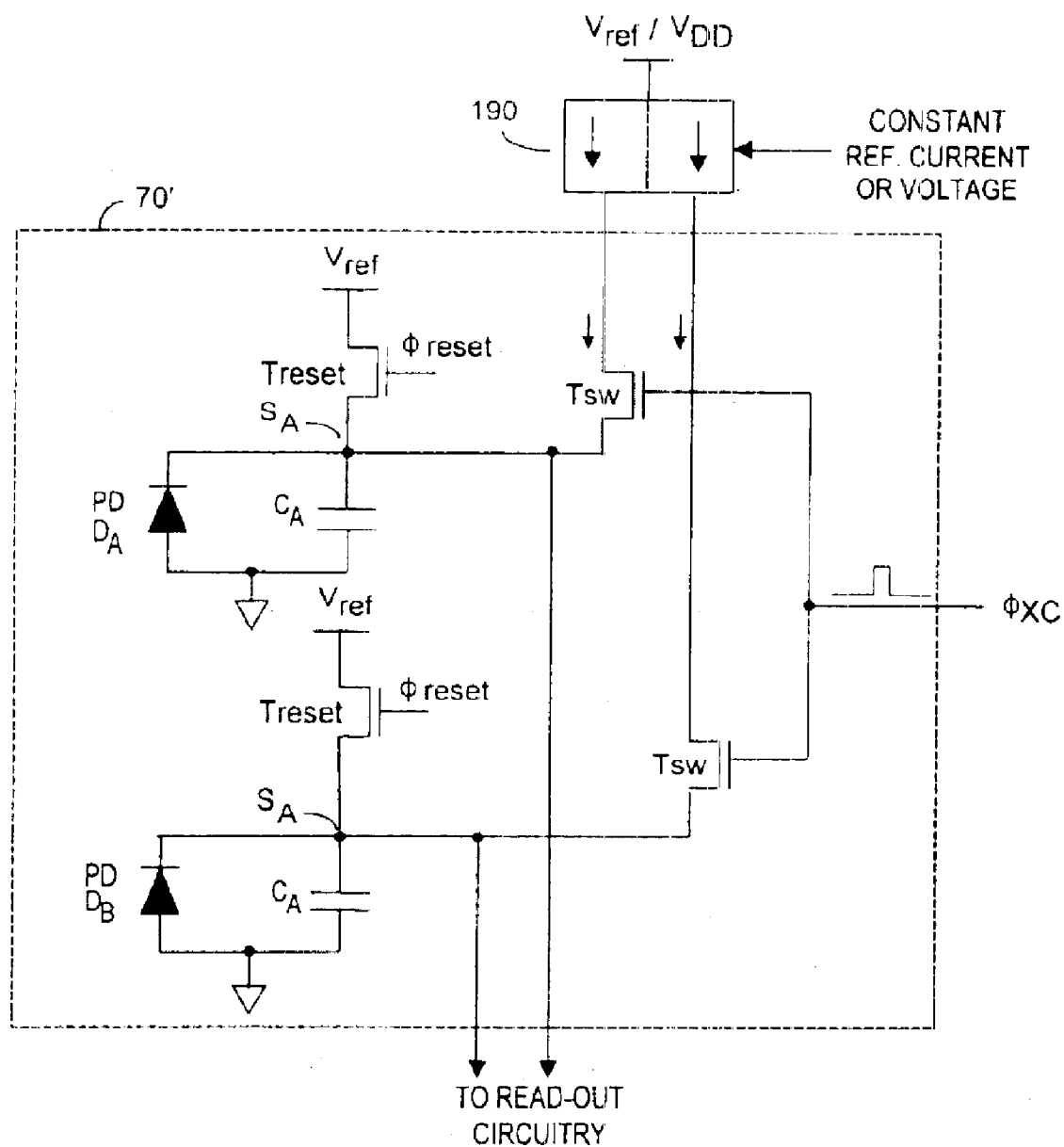
FIG. 9A depicts a resettable differential pixel detector implemented with VCCS/CCCS current mirror, and an external control signal, according to an embodiment of the present invention.

Most of the above-described embodiments accumulate the $D_A$-$D_B$ charge difference in a capacitor, and periodically reset $D_A$ and $D_B$ to $V_{ref}$ to avoid saturation. FIG. 9A depicts an alternative approach in which potentials $V_a$ and $V_b$ are increased by a fixed amount $\Delta V$ before these potentials drop below a certain level due to high-common mode light. This approach is somewhat analogous to the capacitor common mode reset embodiments that have been described. However the embodiment of FIG. 9A uses a separate circuit with an external current source 190.

In the embodiment of FIG. 9A, a periodic injection of a fixed amount of charge into detectors $D_A$ and $D_B$ occurs. The result is that while the differential ($D_A$-$D_B$) charge does not change, the common mode of $D_A$ and $D_B$ is refreshed (i.e., decreased) to prevent photodetector saturation. An external current source 190 is required, which current source may be a reference Voltage Controlled Current Source (VCCS) or perhaps a reference Constant Current Controlled Current source (CCCS), in which case the current source becomes a current mirror.

Figure 9B:
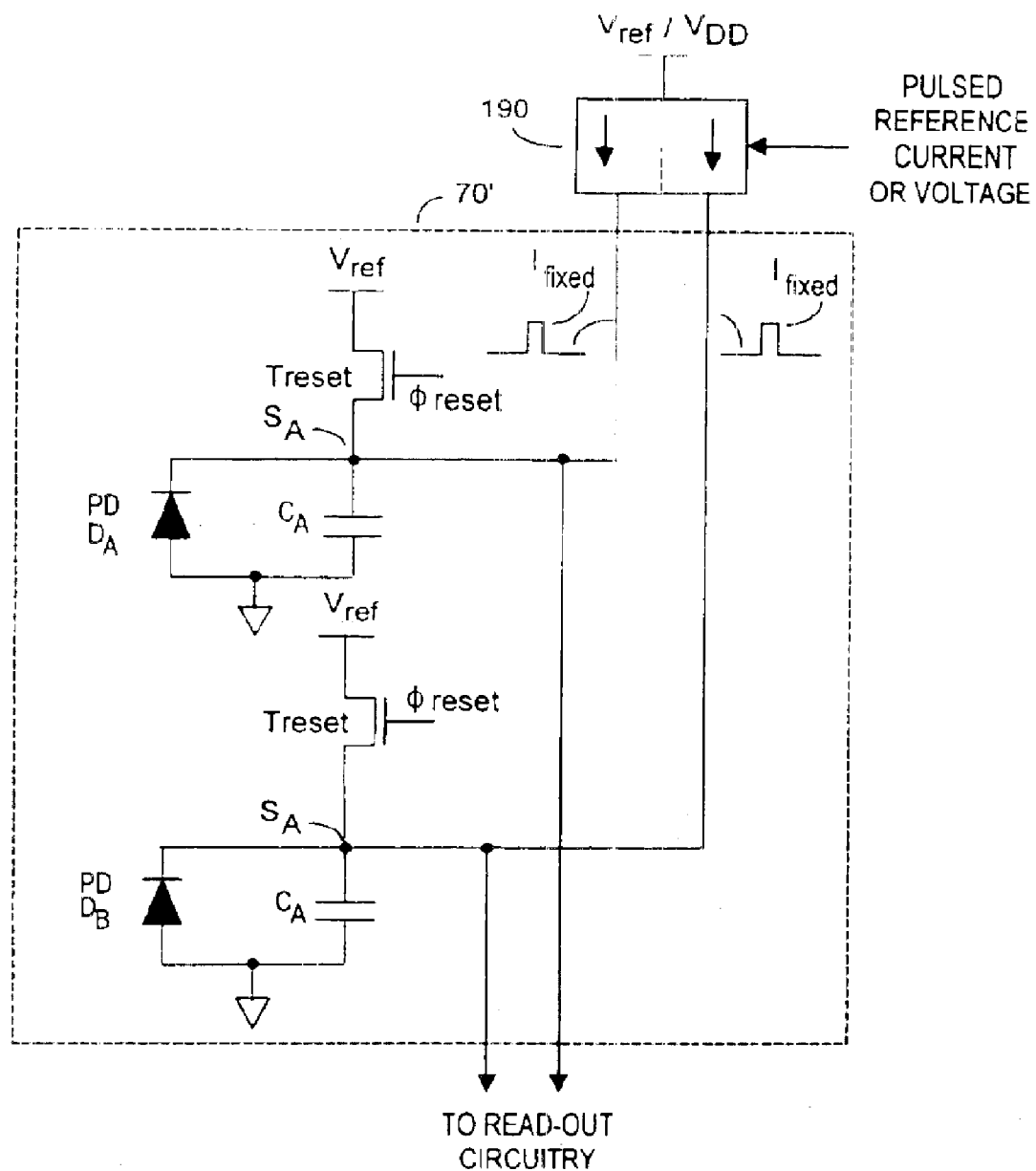
FIG. 9B depicts a resettable differential pixel detector implemented with VCCS/CCCS current mirror, and a pulsed reference input signal, according to an embodiment of the present invention.

The embodiment of FIG. 9A and the embodiment of FIG. 9B demonstrate two approaches to periodically refreshing charge into detectors $D_A$ and $D_B$. In FIG. 9A, current source 190 is always on, but switches Tsw responsive to an external signal $\Phi_{XC}$ are used to couple the constant current output by source 190 to nodes $S_A$ and $S_B$. During integration $\Phi_{XC}$ is periodically turned-on for a brief period of time to charge-up nodes $S_A$ and $S_B$, hundreds of nanoseconds perhaps.

In the embodiment of FIG. 9B, switches $T_{sw}$ are eliminated and instead the input current or voltage to current source 190 is itself pulsed. In essence rather than import a signal $\Phi_{XC}$, $\Phi_{XC}$ pulses are imported into current source 190 and result in current pulses of constant amplitude as shown.

Figure 9C:
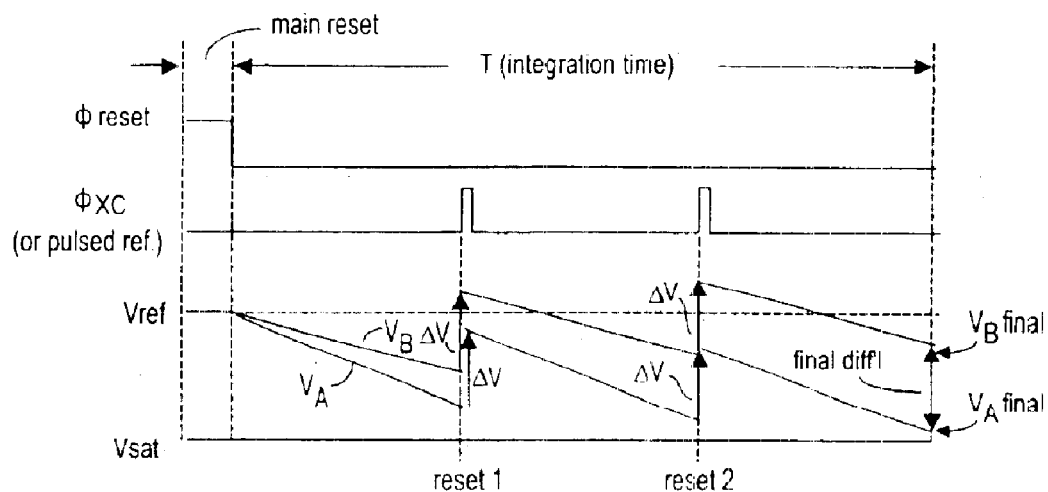
FIG. 9C depicts waveforms found in a current-source implemented differential pixel detector over a two reset sequence, according to an embodiment of the present invention.

FIG. 9C depicts waveforms for the configurations of FIGS. 9A and 9B. Note that advantageously the final differential voltage is simply $(V_A-V_B)$ and that no other computation need be done. The rate at which $\Phi_{XC}$ or the reference input to current count 190 will depend upon the common mode ambient light. A higher rate would be called for in the presence of very strong ambient light to keep source nodes $S_A$ and $S_B$ from saturating.

Figures 9D, 9E:
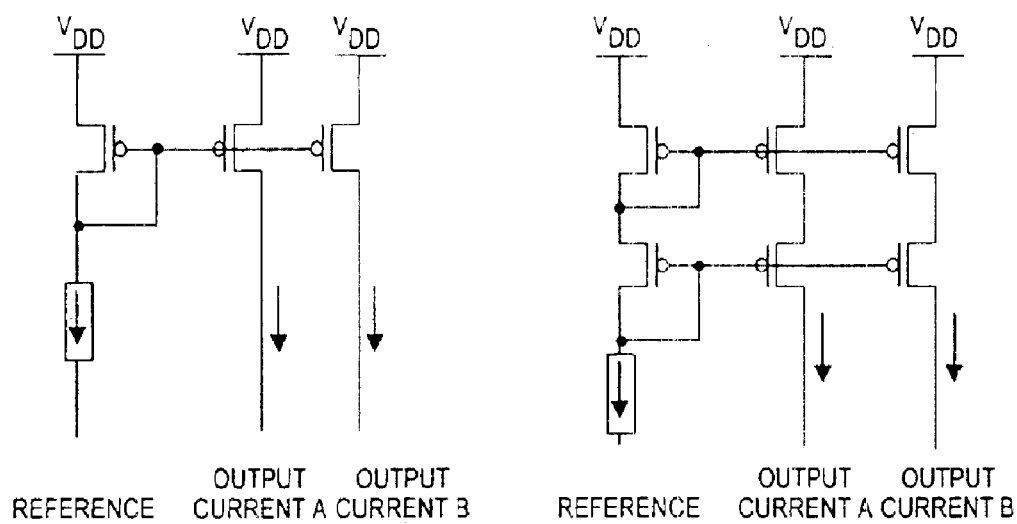
FIG. 9D and FIG. 9E depicts two implementations of a CCCS current mirror for use in a differential pixel detector, according to an embodiment of the present invention.

As noted, current source 190 may be controlled using a voltage reference or a current reference. If a voltage reference is used, the voltage can be $V_{DD}$ or $V_{ref}$, in which case only the $\Phi_{XC}$ signal would be needed to perform common-mode removal. For CCCS (or current mirrors) a variety of circuit configurations are structures are available, two of which are shown in FIGS. 9D and 9E. While the configuration of FIG. 9D has fewer components, its current output may suffer from nonlinearity caused by transistor channel length modulation. The configuration of FIG. 9E provides a cascoded current mirror that is insensitive to voltage at the current output nodes. The choice of current source configuration involves a tradeoff between circuit complexity and accuracy.

An important concern in implementing current mirrors is matching, in this case between output currents A and B. To minimize matching errors, transistors with large values of width and length should be used and should be carefully laid out. For example the orientation of transistors should be the same for currents A and B.

Figure 10A:
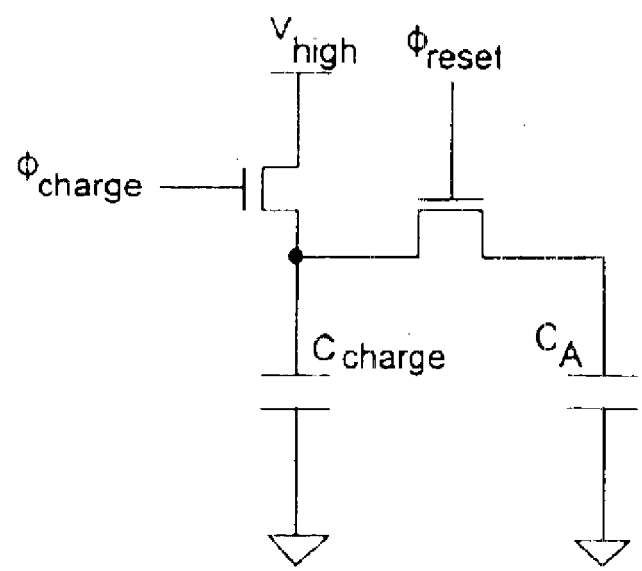
FIG. 10A depicts a configuration for resetting common mode using a shunt capacitor, useable with a resettable differential pixel detector according to an embodiment of the present invention.
Figure 10B:
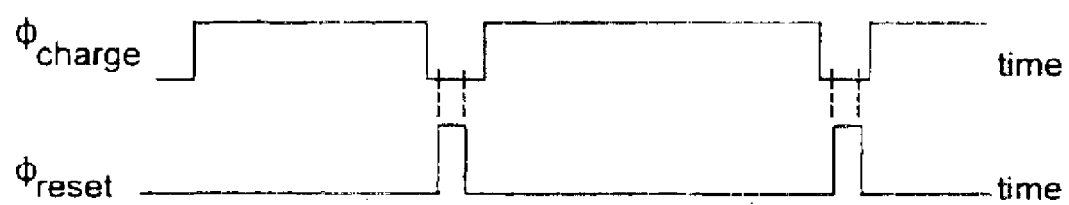
FIG. 10B depicts control waveforms found in the configuration of FIG. 10A, according to an embodiment of the present invention.

FIG. 10A depicts a shunt capacitor embodiment of the present invention to periodically inject a certain amount of charge into photodetector $D_A$ and $D_B$ to compensate for the common mode. FIG. 10A depicts one-half of such a circuit, while FIG. 10B depicts control signal waveforms. A, preferably, very small capacitor $C_{charge}$ is initially charged-up to a relatively high voltage. When charge signal $\Phi_{charge}$ goes low and reset signal $\Phi_{reset}$ goes high, $C_{charge}$ and $C_A$ are connected, and most of the charge will be transferred to $C_A$ since its capacitance is much higher than $C_{charge}$. Since the same amount of charge is added into both halves of the configuration, the common mode signal is reset while the differential mode signal is preserved.

Figure 11:
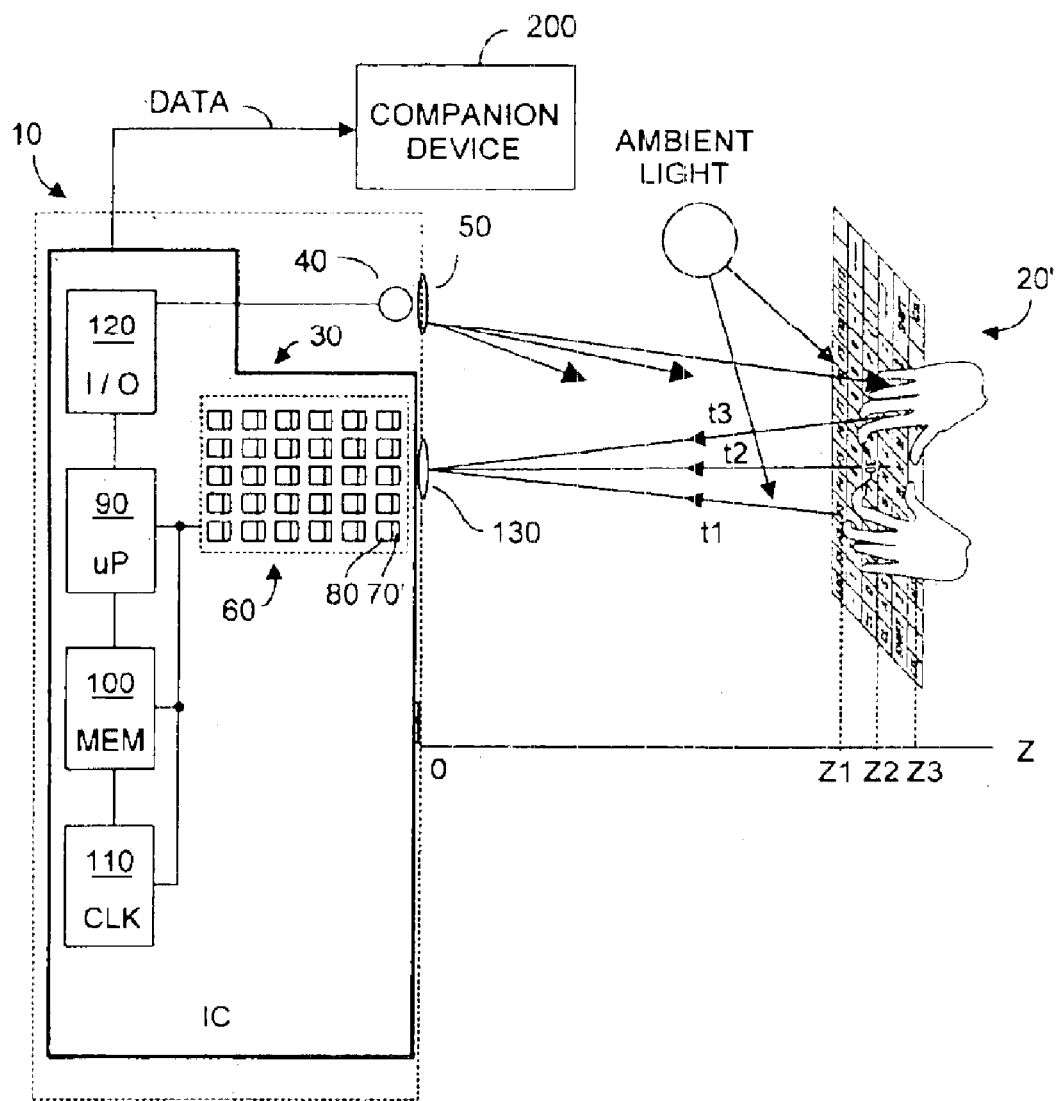
FIG. 11 depicts a range finding type system using differential pixel detectors, according to the present invention.

FIG. 11 is a block diagram of a range finding system 10 using differential pixel detectors 70' according to any of the embodiments described herein. In FIG. 11, target object 20' is an image of a input device, for example an image of a computer keyboard. The image may be printed on a piece of paper or may in fact be optically projected from within system 10. However presented, target object 20' is visible to a user who can type upon the image as though it were a real keyboard. System 10 can measure in three-dimensions the location of whichever virtual keys are typed upon by the user, and in what time order, e.g., did the user type "am" or "ma". This information, which can be obtained even in strong ambient light, can then be passed to a companion device 200, perhaps a cellular telephone, a PDA, a computer, etc. In another application, target object 20' might be an occupant of the front passenger seat in a motor vehicle. System 10 can discern whether the occupant is an adult, a child, an infant, etc., even in strong ambient light. In such application, companion device 200 might be the control electronics for an air bag supplemental restraint system within the car. The control electronics can then intelligently deploy the air bag in one manner if the occupant to be protected is an adult, and can deploy differently if the occupant is a small child.

Although various embodiments of the present invention have been described in the context of dynamic range enhancement for three-dimensional image sensing, it is understood that embodiments of the present invention may be used in other applications that require dynamic range enhancement in the presence of a strong common mode signal. Further, those skilled in the art will appreciate that some or all of the described embodiments may be implemented with components other than the specific semiconductor switches, amplifiers, comparators, integrators, counters, etc. described herein.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method to increase effective differential dynamic range for a differential pixel detector exposed to optical energy having a common mode component, the differential pixel detector including a first photodetector and an associated first capacitor, and a second photodetector and an associated second capacitor, the method comprising:

(a) at start of an integration time T, resetting voltage on each said capacitor to a fixed reference voltage;

(b) during said integration time T, directly integrating photocurrent generated by said first photodetector in said first capacitor, and directly integrating photocurrent generated by said second photodetector in said second capacitor;

(c) within said integration time T, before voltage developed across either said first capacitor or said second capacitor attains a saturation voltage $V_{sat}$ associated with said differential pixel detector resetting the developed voltage on said capacitor such that a desired differential pixel detector signal is still determinable.

2. The method of claim 1 wherein step (c) includes resetting with a reset signal generated external to the different pixel detector.

3. The method of claim 1 wherein step (c) includes resetting with a reset signal generated automatically inside the pixel when voltage developed on either said first capacitor or said second capacitor attains a voltage approaching said saturation voltage.

4. The method of claim 1, wherein step (c) includes resetting said developed voltage on said capacitor to a voltage $V_{ref}$.

5. The method of claim 4, further including sensing voltage developed across each said capacitor to reset voltage developed on each said capacitor to said $V_{ref}$.

6. The method of claim 5, wherein the voltage developed across each of said capacitor is reset in a manner selected from a group consisting of (i) simultaneously and (ii) independently.

7. The method of claim 1, wherein step (c) includes resetting said developed voltage on said capacitor to a voltage $V_{ref}$;

further including a step of counting number of resets of voltage developed across said capacitor during said integration time T;

wherein effective dynamic range of the associated said photodetector is $n \cdot (V_{ref} - V_{sat}) + V_{final}$, where n is said number of resets, and $V_{final}$ is voltage on said capacitor at end of integration time T.

8. The method of claim 7, further including using an analog counter to sense said number of resets.

9. The method of claim 1, wherein said first capacitor is parasitic capacitance associated with said first photodetector, and said second capacitor is parasitic capacitance associated with said second photodetector; further including:

providing a third capacitor switchably coupleable in parallel with said first capacitor, and providing a fourth capacitor switchably coupleable in parallel with said second capacitor;

switchably decoupling said third capacitor from said first photodetector, and switchably decoupling said fourth capacitor from said second photodetector;

switchably inverting and coupling together in parallel said third capacitor and said fourth capacitor such that accumulated charge redistributes therebetween such that a common mode component is substantially reduced;

wherein said desired differential pixel detector signal is still determinable and each reset bring common mode magnitude closer to a voltage $V_{ref}$.

10. The method of claim 1, wherein each said photodetector is selected from a group consisting of a photodiode and a photogate.

11. The method of claim 1, further including controllably injecting a fixed amount of charge into said first capacitor and said second capacitor such that potential on each capacitor is moved away from a potential approaching $V_{sat}$;

wherein said desired differential pixel detector signal is still determinable while common mode is suppressed to prevent saturation.

12. The method of claim 11, wherein said fixed amount of charge is injected by switchably coupling outputs from two matched constant current sources to said first capacitor and said second capacitor.

13. The method of claim 11, wherein said amount of charge is injected by switchably coupling outputs from small high voltage charged capacitors to said first capacitor and said second capacitor, respectively.

14. The method of claim 11, wherein said fixed amount of charge is injected from outputs of pulsed matched constant current sources whose current outputs are coupled to said first capacitor and said second capacitor.

15. A differential pixel detector responsive to optical energy having a common mode component, comprising:

a first photodetector and an associated first capacitor that directly integrates photocurrent generated by said first photodetector during an integration time T;

a second photodetector and an associated second capacitor that directly integrates photocurrent generated by said second photodetector during said integration time T;

means for forcing potential on each said capacitor to a fixed voltage potential before start of said integration time T; and means for resetting potential on either capacitor during said integration time T before said potential attains a saturation voltage $V_{sat}$ associated with said differential pixel detector such that a desired differential pixel detector signal is still determinable.

16. The pixel of claim 15, wherein said means for resetting is triggerable from an external signal.

17. The pixel of claim 15, further including means for detecting when voltage developed on one of said first capacitor or said second capacitor attains a magnitude approaching said saturation voltage $V_{sat}$.

18. The differential pixel detector of claim 15, wherein said means for forcing includes a first switch coupled between a source of a fixed voltage $V_{ref}$ potential and said first capacitor, and a second switch coupled between said source and said second capacitor.

19. The differential pixel detector of claim 18, further including:

a differential comparator having a first input coupled to said first capacitor and a second input coupled to said second capacitor and outputting a differential signal proportional to a difference between signals at said first input and said second input; and a resettable charge pump coupled to receive said differential signal output from said differential comparator and to be reset when each said first capacitor and said second capacitor are reset;

wherein an output from said resettable charge pump is a stored accumulation of voltage differentials between said first photodetector and said second photodetector.

20. The differential pixel detector of claim 15, wherein said means for resetting resets said potential to a voltage $V_{ref}$.

21. The differential pixel detector of claim 15, further including a first counter to count number of resets of potential across said first capacitor during said integration time T;

wherein effective dynamic range of the associated said photodetector is $n \cdot (V_{ref} - V_{sat}) + V_{final}$, where n is said number of resets, $V_{ref}$ is a reset voltage and $V_{final}$ is voltage on said first capacitor at end of integration time T.

22. The differential pixel detector of claim 21, wherein said first counter is selected from a group consisting of (a) a digital counter, and (b) an analog counter.

23. The differential pixel detector of claim 15, wherein said first capacitor is parasitic capacitance associated with said first photodetector, and said second capacitor is parasitic capacitance associated with said second photodetector, said differential pixel detector further including:

a third capacitor switchably coupleable in parallel with said first capacitor, and a fourth capacitor switchably coupleable in parallel with said second capacitor;

means for switchably decoupling said third capacitor from said first photodetector, and switchably decoupling said fourth capacitor from said second photodetector;

means for switchably inverting and coupling together in parallel said third capacitor and said fourth capacitor such that accumulated charge redistributes therebetween such that a common mode component is substantially reduced;

wherein said desired differential pixel detector signal is still determinable and each reset brings common mode magnitude closer to a voltage $V_{ref}$.

24. The differential pixel detector of claim 15, further including:

means for complementarily switchingly coupling each lead of said first capacitor to a source of fixed potential $V_{ref}$, and complementarily switchingly coupling each lead of said second capacitor to said source of fixed potential $V_{ref}$;

a resettable integrator, switchably integrating a potential present at each lead of each said capacitor;

wherein integration provides an output proportional to differential signal present at said first photodetector and said second photodetector while canceling common mode component including KT/C noise substantially independently of matching of components in said differential pixel detector.

25. The differential pixel detector of claim 15, further including:

a mirrored current source to inject a fixed amount of charge into said first capacitor and into said second capacitor such that potential on each capacitor is moved away from a potential approaching $V_{sat}$;

wherein desired differential pixel detector signal is still determinable while common mode is suppressed to prevent saturation;

said mirrored current source selected from a group consisting of (a) a constant current source whose matched outputs are switchably coupled to said first capacitor and said second capacitor, and (b) a pulsed matched constant current source whose current outputs are coupled to said first capacitor and said second capacitor.

26. The differential pixel detector of claim 15, further including:

small high voltage capacitors to inject an amount of charge into said first capacitor and into said second capacitor such that potential on each capacitor is moved away from a potential approaching $V_{sat}$;

wherein said desired differential pixel detector signal is still determinable while common mode is suppressed to prevent saturation.

27. The differential pixel detector of claim 15, wherein each said photodetector is selected from a group consisting of a photodiode and a photogate.

* * * * *